(12) United States Patent
Hayakawa et al.

(10) Patent No.: US 11,964,668 B2
(45) Date of Patent: Apr. 23, 2024

(54) VEHICLE TRAVEL CONTROL METHOD AND TRAVEL CONTROL DEVICE

(71) Applicant: Nissan Motor Co., Ltd., Yokohama (JP)

(72) Inventors: Yasuhisa Hayakawa, Kanagawa (JP); Takahiko Oki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 466 days.

(21) Appl. No.: 17/267,559

(22) PCT Filed: Aug. 13, 2018

(86) PCT No.: PCT/JP2018/030215
§ 371 (c)(1),
(2) Date: Feb. 10, 2021

(87) PCT Pub. No.: WO2020/035897
PCT Pub. Date: Feb. 20, 2020

(65) Prior Publication Data
US 2021/0309242 A1    Oct. 7, 2021

(51) Int. Cl.
*B60W 50/10*  (2012.01)
*B60W 60/00*  (2020.01)

(52) U.S. Cl.
CPC ........ *B60W 50/10* (2013.01); *B60W 60/0051* (2020.02); *B60W 2540/215* (2020.02)

(58) Field of Classification Search
None
See application file for complete search history.

(56) References Cited

U.S. PATENT DOCUMENTS

| | | |
|---|---|---|
| 2017/0261980 A1 | 9/2017 | Matsushita et al. |
| 2017/0293299 A1 | 10/2017 | Matsushita et al. |
| 2018/0105185 A1 | 4/2018 | Watanabe et al. |
| 2018/0173231 A1* | 6/2018 | Takae ................. B60W 30/143 |
| 2018/0354517 A1 | 12/2018 | Banno et al. |
| 2019/0126942 A1 | 5/2019 | Goto et al. |

FOREIGN PATENT DOCUMENTS

| | | |
|---|---|---|
| JP | 2017-159827 A | 9/2017 |
| JP | 2017-185946 A | 10/2017 |
| JP | 2017-200812 A | 11/2017 |
| WO | 2017/064798 A1 | 4/2017 |
| WO | 2017/094316 A1 | 6/2017 |

* cited by examiner

*Primary Examiner* — James J Lee
*Assistant Examiner* — Andrew Sang Kim
(74) *Attorney, Agent, or Firm* — Young Basile Hanlon & MacFarlane, P.C.

(57) ABSTRACT

A travel control method for a vehicle for executing autonomous travel control includes, prior to executing the autonomous travel control, presenting a driver with travel control information as to whether or not to accept execution of the autonomous travel control and detecting, in response to a presentation of the travel control information, an acceptance input made by the driver indicating that the driver accepts the execution of the autonomous travel control. The travel control method also includes: setting an input form of a present acceptance input by the driver to an input form different from an input form of a previous acceptance input.

11 Claims, 25 Drawing Sheets

Before start of previous lane change
(First travel control information)

Before start of present lane change
(Second travel control information)

FIG. 2

| Travel scene | Determination condition | Direction of changing lanes | Necessity level of changing lanes | Time limit |
|---|---|---|---|---|
| Scene of catching up with preceding vehicle | "Preceding vehicle exists ahead" and "Vehicle speed of preceding vehicle < Set vehicle speed of subject vehicle" and "Subject vehicle will reach preceding vehicle within predetermined time" and "Direction of changing lanes is not under lane change prohibition condition" | Toward overtaking lane side | X 1 | Time to reach preceding vehicle – α |
| Scene of approaching tollgate | "Time to reach tollgate located ahead is less than 60 seconds" and "Direction of changing lanes is not under lane change prohibition condition" | Toward empty toll gate booth side | X 2 | Time to reach tollgate – α |
| Scene of approaching merging point | "Time to reach merging point located ahead is less than predetermined time" and "Direction of changing lanes is not under lane change prohibition condition" | Toward opposite side to merging lane | X 3 | Time to reach merging point – α |
| Obstruction scene of subject vehicle lane | "Travel lane of subject vehicle will disappear within predetermined distance" and "Direction of changing lanes is not under lane change prohibition condition" | Toward unobstructed lane side | X 4 | Time to reach obstructed point – α |
| Scene of avoiding object on road | "Pedestrian, bicycle, motorcycle, or fallen object on road exists ahead" and "Direction of changing lanes is not under lane change prohibition condition" | Toward unoccupied lane side | X 5 | Time to reach object on road – α |
| Scene of being caught up by vehicle from behind | "Following vehicle exists in travel lane of subject vehicle" and "Vehicle speed of following vehicle > Vehicle speed of subject vehicle" and "Following vehicle will reach subject vehicle within predetermined time" and "Direction of changing lanes is not under lane change prohibition condition" | Toward opposite side to overtaking lane | X 6 | Time for following vehicle to reach subject vehicle – α |
| Emergency evacuation scene | "Onboard equipment is not operated within predetermined time" and "Driver is determined to be incapable of driving" and "Direction of changing lanes is not under lane change prohibition condition" | Toward road shoulder side | X 7 | None |
| Scene of lane transfer toward destination | "Destination is set" and "Time to reach lane change point is within predetermined time" and "Direction of changing lanes is not under lane change prohibition condition" | Toward lane side for heading to destination | X 8 (X 1 < X 8) | Time to reach lane change point – α |
| Scene of heading to SA/PA | "Time to reach SA/PA is within predetermined time" "Elapsed time after previous rest is predetermined time or more" and "Direction of changing lanes is not under lane change prohibition condition" | Toward lane side near SA/PA | X 9 | Time to reach SA/PA – α |

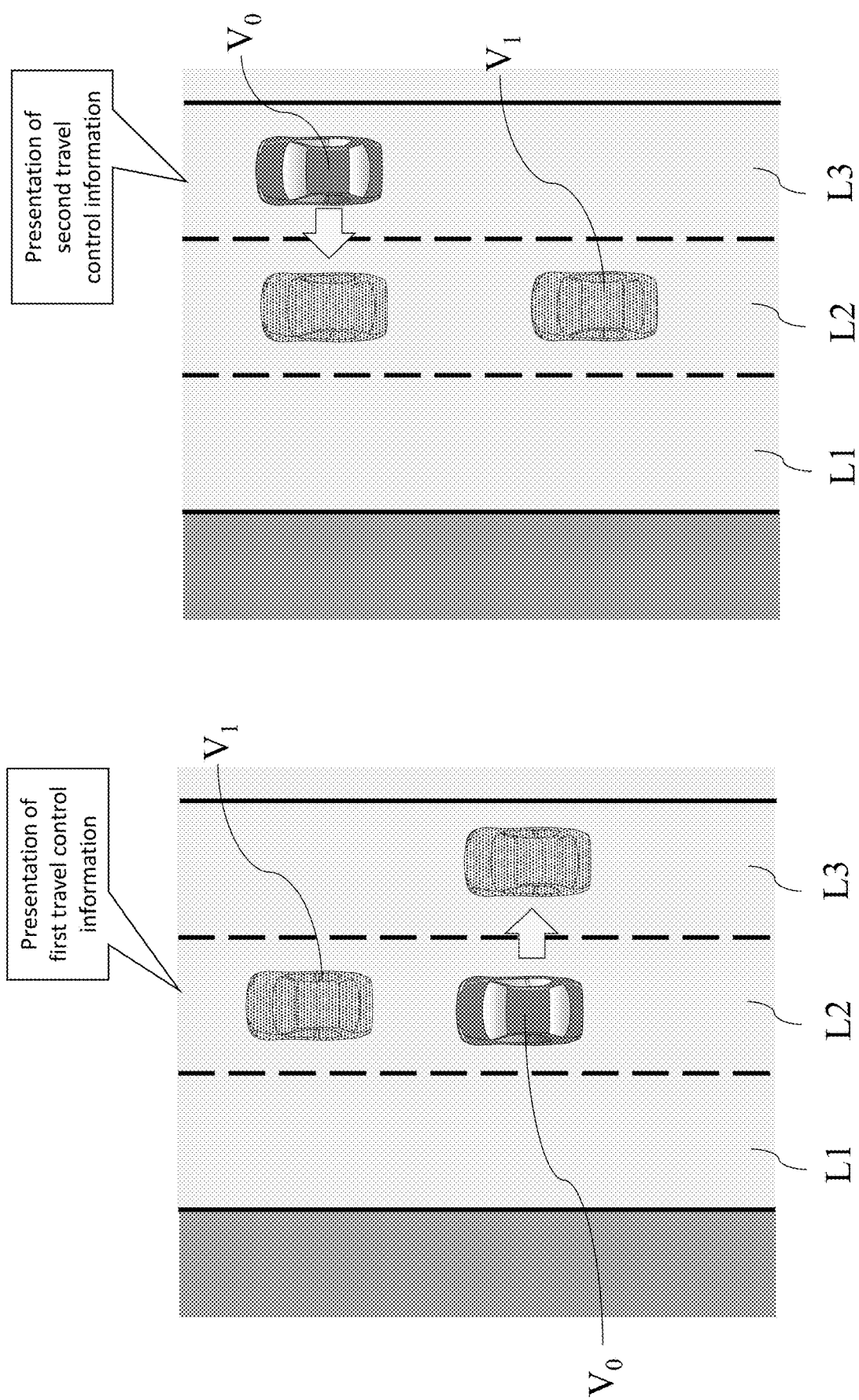

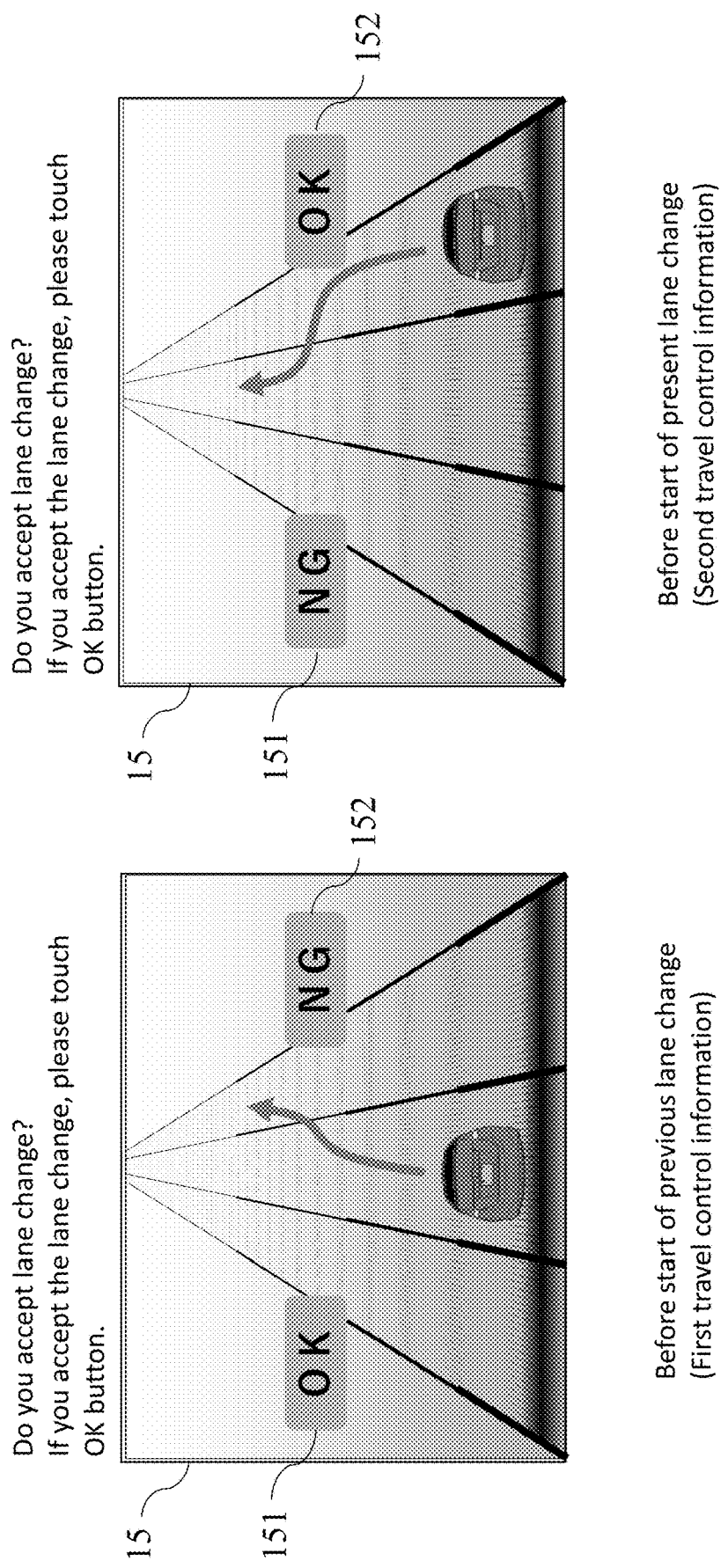

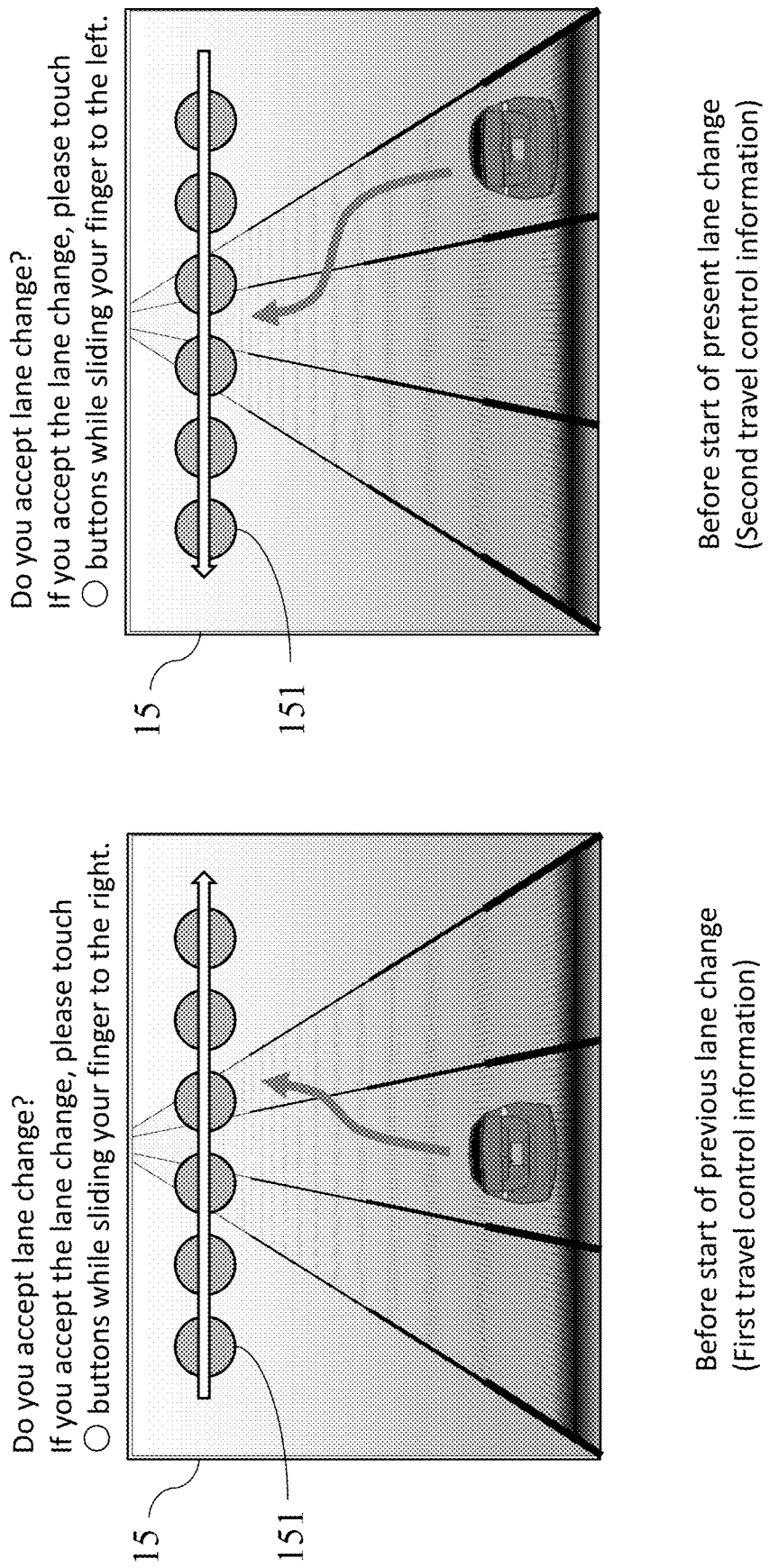

FIG. 4E
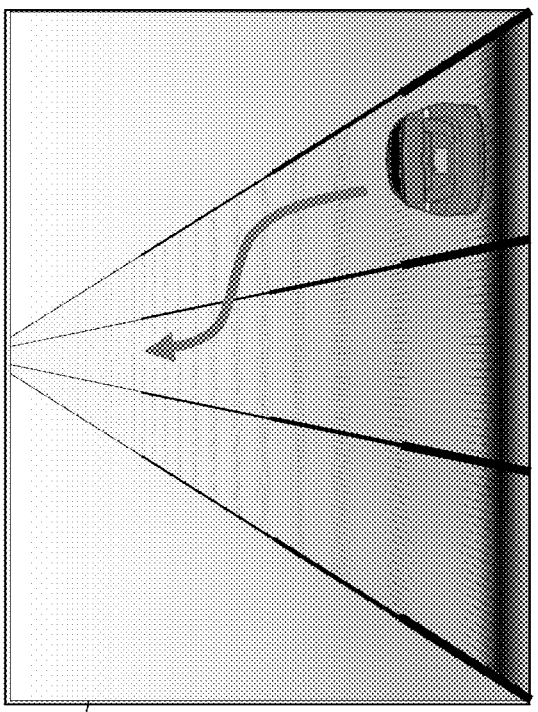
Before start of present lane change
(Second travel control information)
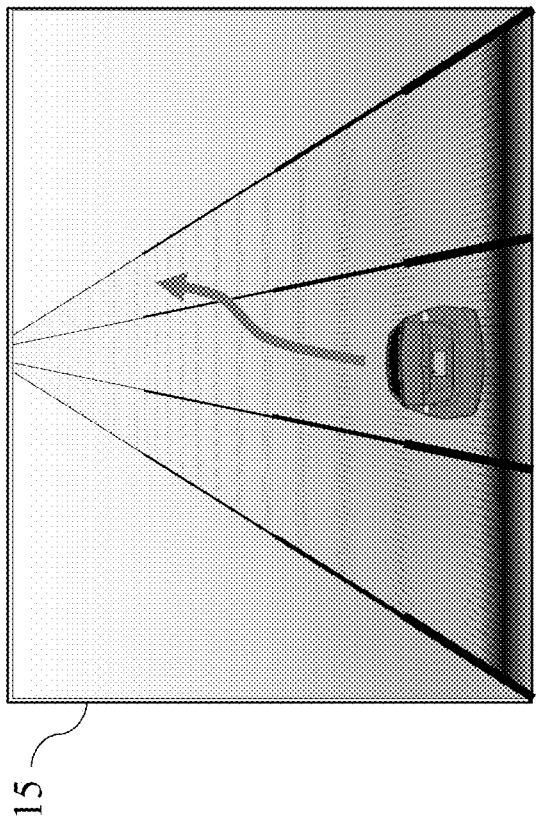
Before start of previous lane change
(First travel control information)

VEHICLE TRAVEL CONTROL METHOD AND TRAVEL CONTROL DEVICE

TECHNICAL FIELD

The present invention relates to a travel control method and a travel control apparatus for a vehicle which include change control of travel lane, right turn travel control or left turn travel control, departure travel control from the main road or entry travel control into the main road, etc.

BACKGROUND

A driving assist device is known with the purpose of encouraging the driver to confirm safety by himself/herself when controlling the vehicle to autonomously change lanes (WO2017/094316).

When a determination is made that lane change is possible, this device determines whether or not the driver has performed the lane change safety confirmation action based on either face orientation or eye direction detected by the imaging images of the driver's head, and autonomously performs the lane change based on the determined results.

SUMMARY

However, in the prior art, it is difficult to determine whether or not the driver is actually monitoring autonomous travel control system because it determines whether or not the safety confirmation action has been performed only by predetermined uniquely action of the driver.

The problem to be solved by present invention is to provide a travel control method and a travel control apparatus for the vehicle that allows driver to monitor operation of the vehicle when executing autonomous travel control of the vehicle.

The present invention solves the above problem through setting an input form of an acceptance input by the driver to an input form different from an input form of a previous acceptance input when executing autonomous travel control for the vehicle.

According to the present invention, the driver will be aware of or pay attention to the changed input form because each time the autonomous travel control is executed, the input form of the acceptance input by the driver is changed. This allows the driver to monitor operation of the vehicle.

BRIEF DESCRIPTION OF THE DRAWINGS

FIG. 2 is a diagram illustrating an example of a table used for determination of a travel scene;

FIG. 3 is a plan view illustrating a scene of lane changes according to one or more embodiments of the present invention;

FIG. 4B is a set of diagrams illustrating a second presentation form of the lane change information presented during execution of the lane change control according to one or more embodiments of the present invention;

FIG. 4D is a set of diagrams illustrating a fourth presentation form of the lane change information presented during execution of the successive lane change control according to one or more embodiments of the present invention;

FIG. 4E is a set of diagrams illustrating a fifth presentation form of the lane change information presented during execution of the successive lane change control according to one or more embodiments of the present invention;

DETAILED DESCRIPTION

Figure 1:
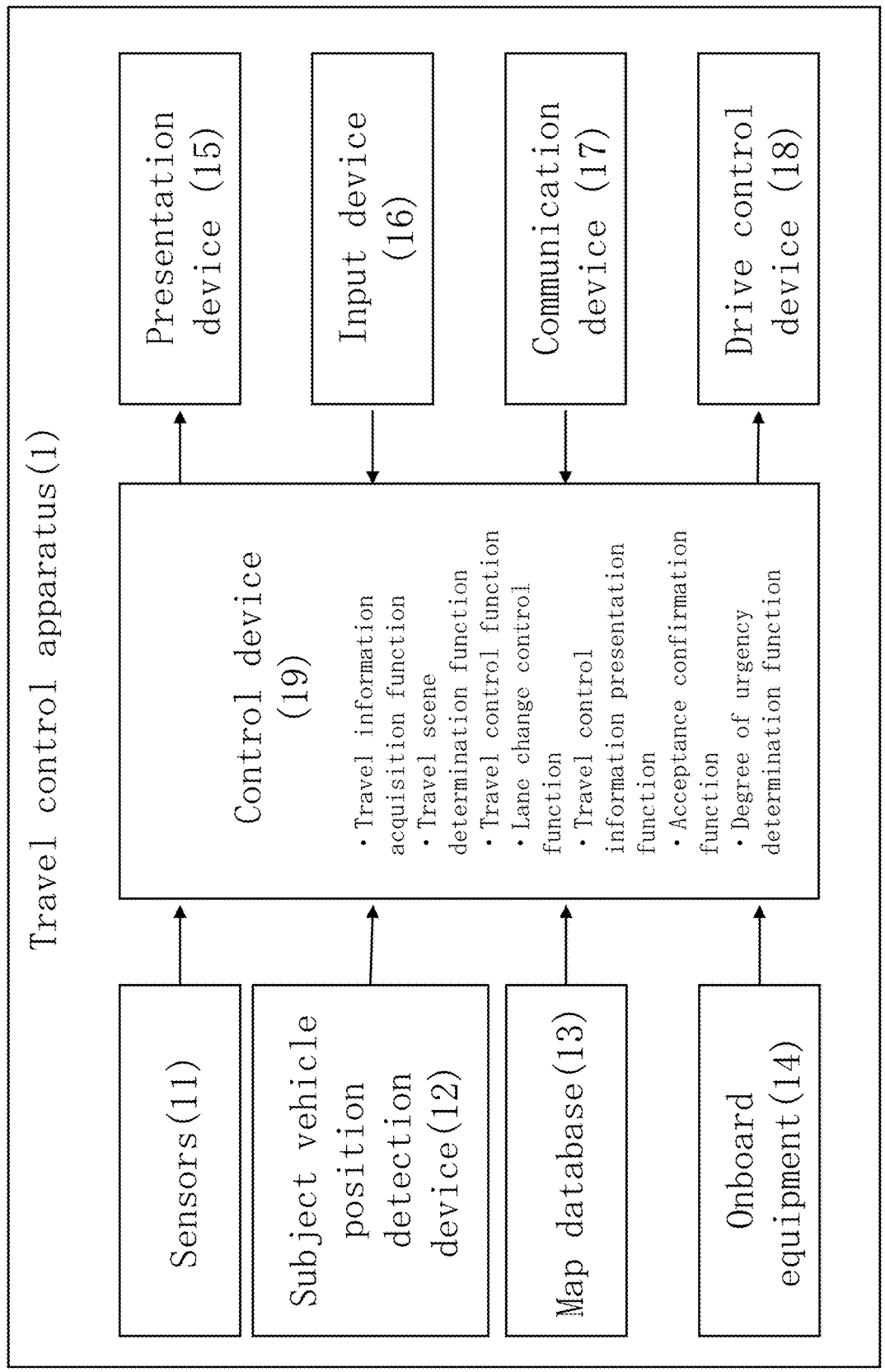
FIG. 1 is a block diagram showing an embodiment of the travel control apparatus for a vehicle according to the present invention.

FIG. 1 is a block diagram illustrating the configuration of a travel control apparatus 1 for a vehicle according to one or more embodiments of the present invention. The travel control apparatus 1 for a vehicle according to one or more embodiments of the present invention represents an embodiment of carrying out the travel control method for a vehicle according to the present invention. As illustrated in FIG. 1, the travel control apparatus 1 for a vehicle according to one or more embodiments of the present invention includes sensors 11, a subject vehicle position detection device 12, a map database 13, onboard equipment 14, a presentation device 15, an input device 16, a communication device 17, a drive control device 18, and a control device 19. These devices are connected to one another, for example, via a controller area network (CAN) or other onboard LAN for mutually exchanging information.

The sensors 11 detect a traveling state of a subject vehicle. Examples of the sensors 11 include a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, and an onboard camera that captures images of the driver. The sensors 11 may be represented by one of the above-described various sensors or may also be configured as a combination of two or more sensors. The detection results of the sensors 11 are output to the control device 19 at predetermined time intervals.

The subject vehicle position detection device 12 is composed of a GPS unit, a gyro-sensor, a vehicle speed sensor, and other components. The subject vehicle position detection device 12 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 19 at predetermined time intervals.

The map database 13 stores map information that includes positional information of various facilities and specific points. Specifically, the map database 13 stores positional information of merging points and branching points on roads, tollgates, positions at which the number of lanes decreases, service areas (SA)/parking areas (PA), etc. together with the map information. The control device 19 can refer to the map information stored in the map database.

The onboard equipment 14 includes various modules equipped in the vehicle and is operated by the driver. Examples of such onboard equipment include a steering, an accelerator pedal, a brake pedal, a navigation device, an audio device, an air conditioner, a hands-free switch, power windows, wipers, lights, flashers, a horn, and specific switches. When the driver operates the onboard equipment 14, its information is output to the control device 19.

The presentation device 15 is, for example, a device such as a display of a navigation device, a display incorporated in a rearview mirror, a display incorporated in a meter unit, a head-up display projected on a windshield, a speaker of an audio device, or a seat device with embedded vibrating bodies. The presentation device 15 informs the driver of presentation information and travel control information, which will be described later, under the control by the control device 19. The travel control information includes information on starting autonomous travel control of the vehicle, information on lane change control of the vehicle, information on right turn travel control or left turn travel control of the vehicle, information on departure travel control of the vehicle from the main road, entry travel control of the vehicle into the main road and the like.

The input device 16 is, for example, a device such as a dial switch or a touch panel disposed on a display screen with which the driver can input information by the manual operation or a microphone with which the driver can input information by the voice. In one or more embodiments of the present invention, the driver can operate the input device 16 thereby to input response information in response to the presentation information which is presented by the presentation device 15. For example, in one or more embodiments of the present invention, switches of flashers or other onboard equipment 14 can also be used as the input device 16. More specifically, the input device 16 may be configured such that the driver turns on the switch of a flasher thereby to input acceptance or permission for changing travel control in response to a query as to whether or not the control device 19 autonomously performs the travel control changes. The response information which is input via the input device 16 is output to the control device 19.

The communication device 17 performs communication with communication equipment located outside the subject vehicle. For example, the communication device 17 performs vehicle-to-vehicle communication with another vehicle, performs road-to-vehicle communication with equipment provided at a road shoulder, or performs wireless communication with an information server provided outside the vehicle and can thereby acquire various information items from the external equipment. The information acquired by the communication device is output to the control device 19.

The drive control device 18 controls travel of the subject vehicle. For example, when the subject vehicle performs follow-up travel control to follow a preceding vehicle, the drive control device 18 controls the operation of a drive mechanism (which includes the operation of an internal-combustion engine in the case of an engine car and the operation of an electric motor for travel in the case of an electric car and further includes the torque distribution for an internal-combustion engine and an electric motor for travel in the case of a hybrid car) and the braking operation to achieve the acceleration, deceleration, and vehicle speed so that the distance between the subject vehicle and the preceding vehicle is maintained at a constant distance. Additionally or alternatively, when the subject vehicle performs lane keeping control of detecting lane marks of a lane in which the subject vehicle travels (also referred to as a "subject lane," hereinafter) and controlling the traveling position of the subject vehicle in the road width direction so that the subject vehicle travels in the subject lane, or when the subject vehicle performs lane change control such as overtaking of a preceding vehicle or change of the traveling direction, or when the subject vehicle performs travel control of turning right or left at an intersection or the like, the drive control device 18 executes the steering control of the subject vehicle by controlling the operation of the steering actuator in addition to the operation of the drive mechanism and the braking operation for achieving the acceleration, deceleration, and vehicle speed. The drive control device 18 controls travel of the subject vehicle in accordance with commands from the control device 19, which will be described below. Any of other well-known methods can also be used as the travel control method executed by the drive control device 18.

The control device 19 is composed of a read only memory (ROM) that stores programs for controlling travel of the subject vehicle, a central processing unit (CPU) that executes the programs stored in the ROM, and a random access memory (RAM) that serves as an accessible storage device. A micro processing unit (MPU), a digital signal processor (DSP), an application specific integrated circuit (ASIC), a field programmable gate array (FPGA), or the like can be used as an operation circuit as substitute for or in addition to the CPU.

The control device 19 executes the programs stored in the ROM using the CPU thereby to achieve a travel information acquisition function of acquiring information regarding a traveling state of the subject vehicle, a travel scene determination function of determining a travel scene of the subject vehicle, a travel control function of controlling travel of the subject vehicle, a lane change control function of determining whether or not changing lanes is possible and controlling the changing lanes, a travel control information presentation function of presenting the driver with lane change information regarding the travel operation of the subject vehicle executed by the lane change control, an acceptance confirmation function of confirming whether or not the driver accepts the changing lanes in response to the presented lane change information and a degree of urgency determination function of determining a degree of urgency of acceptance by the driver. These functions of the control device 19 will be described below.

The travel information acquisition function of the control device 19 is a function of acquiring the travel information regarding the traveling state of the subject vehicle. For example, the control device 19 uses the travel information acquisition function to acquire as the travel information the external image information around the vehicle captured by the front camera and rear camera included in the sensors 11 and/or the detection results by the front radar, rear radar, and side radars included in the sensors 11. Additionally or alternatively, the control device 19 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

Additionally or alternatively, the control device 19 uses the travel information acquisition function to acquire as the travel information the information on the current position of the subject vehicle from the subject vehicle position detection device 12. Additionally or alternatively, the control device 19 uses the travel information acquisition function to acquire as the travel information the positional information of merging points, branching points, tollgates, positions at which the number of lanes decreases, service areas (SA)/parking areas (PA), etc. from the map database 13. In addition, the control device 19 uses the travel information acquisition function to acquire as the travel information the information on an operation of the onboard equipment 14 performed by the driver from the onboard equipment 14.

The travel scene determination function of the control device 19 is a function of referring to a table stored in the ROM of the control device 19 to determine the travel scene in which the subject vehicle is traveling. FIG. 2 is a diagram illustrating an example of the table used for determination of the travel scene. As illustrated in FIG. 2, the table stores travel scenes suitable for changing lanes and the determination condition for each travel scene. The control device 19 uses the travel scene determination function to refer to the table illustrated in FIG. 2 to determine whether or not the travel scene of the subject vehicle is a travel scene suitable for changing lanes.

For example, in the example illustrated in FIG. 2, the determination condition for a "scene of catching up with a preceding vehicle" is defined by four conditions: a condition that "a preceding vehicle exists ahead," a condition of "the vehicle speed of the preceding vehicle<the set vehicle speed of the subject vehicle," a condition of "reaching the preceding vehicle within a predetermined time," and a condition that "the direction of changing lanes is not under a lane change prohibition condition." The control device 19 uses the travel scene determination function to determine whether or not the subject vehicle satisfies the above conditions, for example, on the basis of the detection results by the front camera and/or front radar included in the sensors 11, the vehicle speed of the subject vehicle detected by the vehicle speed sensor included in the sensors 11, the positional information of the subject vehicle detected by the subject vehicle position detection device 12, etc. When the above conditions are satisfied, the control device 19 determines that the subject vehicle is in the "scene of catching up with a preceding vehicle" Likewise, for all other travel scenes registered in the scene determination table illustrated in FIG. 2, the control device 19 uses the travel scene determination function to determine whether or not each determination condition is satisfied.

Examples of the lane change prohibition condition include a condition that "the subject vehicle is traveling in a lane change prohibition area," a condition that "an obstacle exists in the direction of changing lanes," a condition that "the subject vehicle will get across a centerline (road center line)," and a condition that "the subject vehicle will enter a road shoulder or get across a road end." On a road on which emergency stop is permitted at a road shoulder or the like in an "emergency evacuation scene," the condition that "the subject vehicle will enter a road shoulder or get across a road end" may be permitted in the "emergency evacuation scene." In the table illustrated in FIG. 2, the necessity level of changing lanes, the time limit, and the direction of changing lanes will be described later.

When the travel scene of the subject vehicle corresponds to a plurality of travel scenes, the control device 19 uses the travel scene determination function to determine a travel scene having a higher necessity level of changing lanes as the travel scene of the subject vehicle. For example, it is assumed that, in the table illustrated in FIG. 2, the travel scene of the subject vehicle corresponds to a "scene of catching up with a preceding vehicle" and a "scene of lane transfer toward a destination" and the necessity level X1 of changing lanes in the "scene of catching up with a preceding vehicle" is lower than the necessity level X8 of changing lanes in the "scene of lane transfer toward a destination" (X1<X8). In this case, the control device 19 uses the travel scene determination function to determine the "scene of lane transfer toward a destination" with the higher necessity level of changing lanes as the travel scene of the subject vehicle. The "scene of lane transfer toward a destination" refers to a scene of changing lanes for transfer from a lane in which the subject vehicle is currently traveling, such as at a location before a branching point or an exit of a road with multiple lanes, to a lane in the intended branch direction or exit direction.

The travel control function of the control device 19 is a function of controlling travel of the subject vehicle. For example, the control device 19 uses the travel control function to detect lane marks of the subject lane in which the subject vehicle travels, on the basis of the detection results of the sensors 11 and perform the lane keeping control of controlling the traveling position of the subject vehicle in the road width direction so that the subject vehicle travels in the subject lane. In this case, the control device 19 uses the travel control function to allow the drive control device 18 to control the operation of the steering actuator and the like so that the subject vehicle travels at an appropriate traveling position. Additionally or alternatively, the control device 19 can also use the travel control function to perform the follow-up travel control of autonomously following a preceding vehicle with a certain distance from the preceding vehicle. When performing the follow-up travel control, the control device 19 uses the travel control function to output control signals to the drive control device 18, which controls the operation of the drive mechanism such as the engine and brake so that the subject vehicle travels with a constant distance between the subject vehicle and the preceding vehicle. Additionally or alternatively, in the following, lane-keeping control, tracking travel control, right/left turn travel control, and lane change control, will be described as autonomous travel control.

The lane change control function of the control device 19 is a function of determining whether or not to perform changing lanes, on the basis of the travel scene of the subject vehicle and/or information on obstacles existing around the subject vehicle. Additionally or alternatively, the lane change control function is a function of allowing the drive control device 18 to control the operation of the drive mechanism such as the engine and brake and the operation of the steering actuator when determining to perform changing lanes. Additionally or alternatively, the lane change control function is a function of setting the start timing of starting the lane change control on the basis of the traveling state of the subject vehicle and the state of the driver and executing the lane change control in accordance with the set start timing. Details of the lane change control using the lane change control function will be described later.

The travel control information presentation function of the control device 19 is a function of presenting the driver, via the presentation device 15, with information regarding the travel operation of the subject vehicle executed by the autonomous travel control including lane-keeping control, tracking travel control, right/left turn travel control, lane change control, and other information. For example, when a branching point of a road, an exit of an expressway or a servicing area of a car exists ahead during execution of the lane keeping control, changing lanes may be necessary by changing the traveling direction of the subject vehicle. Additionally or alternatively, when a preceding vehicle changes lanes during execution of the follow-up control of following the preceding vehicle, the subject vehicle may also change lanes accordingly. In addition, a change in travel direction of turning right or left at an intersection or the like may be required in the middle of the route to the destination. When such travel operation is executed by the autonomous travel control, the control device 19 uses the travel control information presentation function to present the driver with the information regarding the travel operation by the travel control in order to determine whether or not the travel operation is possible, and encourage the driver to confirm safety by himself/herself when the travel operation is possible. The timing of presenting the travel control information may be at least before the start of the travel operation because the presentation of the travel control information is for the purpose of safety confirmation by the driver himself/herself.

Here, an example of a travel control information presented to the driver before the start of the travel operation will be described. FIG. 3 is a plane view illustrating a scene of a lane changes according to one or more embodiments of present invention, that is, a plane view illustrating the scene where, on a road having three lanes L1, L2, and L3 on each side of the left-hand traffic, the subject vehicle $V_0$ overtakes another vehicle $V_1$ in travel ahead. The left view of FIG. 3 is a plane view illustrating an example of a lane change control for execution of lane change from the lane L2 in which the subject vehicle is currently traveling to the adjacent lane L3. And the right view of FIG. 3 is a plane view illustrating an example of a lane change control for returning to the lane L2 after overtaking another vehicle $V_1$.

In one or more embodiments of the present invention, when performing two or more lane changes, the presentation device 15 presents a first travel control information indicating that lane change is to be performed before performing the first lane change control. When the driver shows the intention to accept this presentation, the presentation device 15 presents a second travel control information indicating that the second lane change is to be performed, after executing the first lane change and before executing the second lane change control. FIG. 3 illustrates an example of performing two lane changes. Likewise, when performing three or more lane changes, the presentation device 15 presents the travel control information, which indicates that the lane change is to be performed, before performing the next lane change, and confirms the acceptance of the driver. In this way, the control device 19 according to one or more embodiments of the present invention uses the travel control information presentation function to encourage the driver to confirm safety by himself/herself each time lane change is performed.

When the presentation device 15 includes a display, the form of presentation on the presentation device 15 using the travel control information presentation function may be a form of display of a visual pattern including an image, a language, etc. Additionally or alternatively, when the presentation device 15 includes a speaker, the presentation device 15 presents the driver with the travel control information including the direction of movement of the subject vehicle in the road width direction by the lane change control (e.g., guidance information indicating the lane change in the right or left direction) as audio information (voice or sound). Additionally or alternatively, when the presentation device 15 includes one or more warning lamps installed on the instrument panel or the like, a specific warning lamp may be lit in a specific presentation form thereby to present the driver with the travel control information including the direction of movement of the subject vehicle in the road width direction by the lane change control. Additionally or alternatively, when the presentation device 15 includes a seat device with a plurality of embedded vibrating bodies, a specific vibrating body may be vibrated in a specific presentation form thereby to present the driver with the travel control information including the direction of movement of the subject vehicle in the road width direction by the lane change control.

Thus, instead of or in addition to displaying the travel control information on the display as visual information, presenting the driver with the travel control information as audio information such as voice and sound, as visual information via the display of a warning lamp, or as tactile information via the vibration allows the driver to more intuitively perceive the travel control information. In the travel control apparatus 1 for a vehicle according to one or more embodiments of the present invention, in order to awaken the driver's awareness or attention to the travel control information presented on the presentation device 15, the driver's acceptance action for each execution of the travel operation by the travel control is set in relation to the presentation of the travel control information as follows.

The acceptance confirmation function of the control device 19 is a function of confirming whether or not the driver accepts the travel operation by the travel control in response to the travel control information presented using the travel control information presentation function. FIGS. 4A to 4E are sets of diagrams illustrating examples of the input form of the driver's acceptance in response to various forms of the travel control information presented using the travel control information presentation function. In these examples, the lane change information is presented using the display and speaker of the presentation device 15. As described above, the travel control information according to one or more embodiments of the present invention includes, in addition to the lane change information, the change information on right turn travel control or left turn travel control, and the change information on the departure travel control from the main road or the entry travel control into the main road. FIGS. 4A to 4E illustrates an example of the two lane change controls illustrated in FIG. 3, in which the change of the travel control (first lane change control) is executed and then the change of the travel control (second lane change control) different from the first lane change control.

Incidentally, the embodiment illustrated in FIG. 4A to FIG. 4E explains the scene when, during the autonomous travel control of the vehicle, the vehicle shifts to the first travel control, which is different from the previous travel control, and, after shifting to the first travel control, shifts to the second travel control, which is different from the first travel control. However, in the example illustrated in FIGS. 4A to 4E, "the case when, during the autonomous travel control of the vehicle, the vehicle shifts to the first travel control, which is different from the previous travel control" corresponds to "previous lane change". And in the example illustrated in FIGS. 4A to 4E, "the case when, after shifting to the first travel control, the vehicle shifts to the second travel control, which is different from the first travel control" corresponds to "present lane change". However, in the travel control apparatus and the travel control method of the present invention, the shift to the first travel control and the shift to the second travel control may be the same lane change control or may be different travel control. For example, the shift to the first travel control may be the shift to the lane change control, and the shift to the second travel control may be the shift to the left turn travel control or the shift to the departure travel control from the main road. In short, there should be two or more scenes when the driver is requested to give acceptance.

Figure 4A:
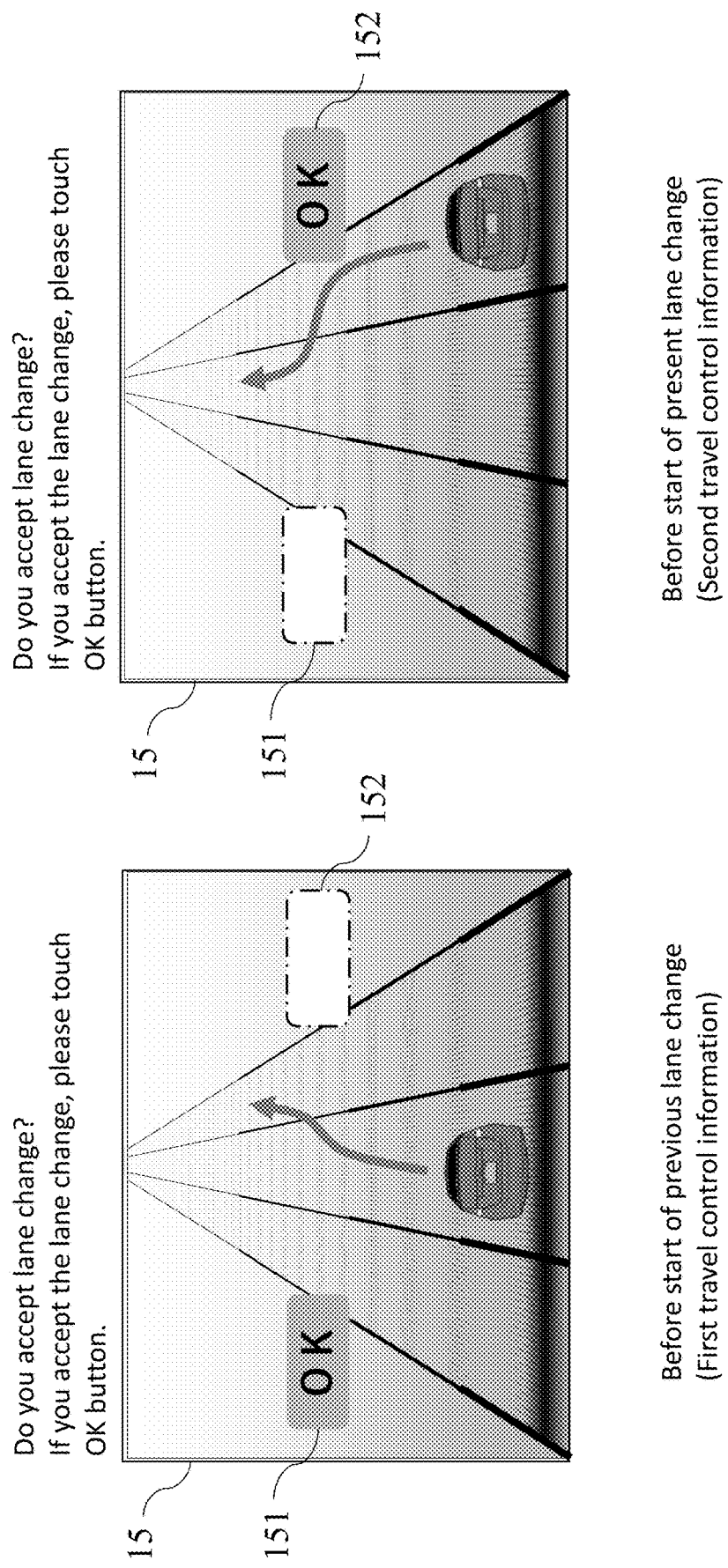
FIG. 4A is a set of diagrams illustrating a first presentation form of the lane change information presented during execution of the lane change control according to one or more embodiments of the present invention.

The left diagram of FIG. 4A illustrates the first travel control information presented on the presentation device 15 before starting the lane change from the center lane L2 to the rightmost lane L3 as illustrated in FIG. 3, while the right diagram of FIG. 4A illustrates the second travel control information presented on the presentation device 15 after the first lane change is performed and before the second lane change control is started. In this example, before starting the lane change from the center lane L2 to the rightmost lane L3, as illustrated in the left diagram of FIG. 4A, the display of the presentation device 15 displays the subject vehicle $V_O$ and the front view image data including the lanes L1, L2, and L3 together with a lane change destination of the subject vehicle $V_O$, and an OK button (an input button for the input indicating that the driver accepts the lane change, the same shall apply hereinafter). The lane change destination of the subject vehicle $V_O$ is displayed by using a visual pattern such as an arrow. Incidentally, the presentation device 15 includes a first input unit 151 set to the first input position in the left center of FIG. 4A, and a second input unit 152 set to the second input position in the right center of FIG. 4A. The second input position is different from the first input position. In the left diagram of FIG. 4A, the OK button is set to the first input unit 151 and is not set to the second input unit 152. In addition, along with this display, voice data is output from the speaker, such as "Do you accept the lane change? If you accept the lane change, please touch the OK button." Additionally or alternatively, the voice data may be displayed as character data on the display.

In response to the first travel control information illustrated in the left diagram of FIG. 4A, the driver visually checks the surrounding situation and the like by himself/herself, and in the case of determining to accept the lane changes or in other similar cases, the driver touches the OK button set to the first input unit 151. This allows the control device 19 to execute the lane change control related to the first lane change (lane change from the lane L2 to the lane L3). On the other hand, when the driver's touch on the OK button is not detected for some reason, the control device 19 discontinues the first lane change control (lane change from the lane L2 to the lane L3).

When the driver touches the OK button in response to the first travel control information illustrated in the left diagram of FIG. 4A, the control device 19 executes the lane change control related to the first lane change (lane change from the lane L2 to the lane L3). Thereafter, when a determination is made that the lane change from the rightmost lane L3 to the center lane L2 is possible, the presentation device 15 presents the second travel control information illustrated in the right diagram of FIG. 4A before starting the lane change from the rightmost lane L3 to the center lane L2. In this example, before starting the second lane change from the rightmost lane L3 to the center lane L2, as illustrated in the right diagram of FIG. 4A, the display of the presentation device 15 displays the subject vehicle $V_O$ and the front view image data including the lanes L1, L2, and L3 together with a lane change destination of the subject vehicle $V_O$ and the OK button. The lane change destination of the subject vehicle $V_O$ is displayed by using a visual pattern such as an arrow. In the right diagram of FIG. 4A, the OK button is set to the second input unit 152, and is not set to the first input unit 151. In addition, along with this display, voice data is output from the speaker, such as "Do you accept the lane change? If you accept the lane change, please touch the OK button." Additionally or alternatively, the voice data may be displayed as character data on the display.

In response to the second travel control information illustrated in the right diagram of FIG. 4A, the driver visually checks the surrounding situation and the like by himself/herself, and in the case of determining to accept the lane change or in other similar cases, the driver touch the OK button set to the second input unit 152. This allows the control device 19 to execute the lane change control related to the second lane change (lane change from the lane L3 to the lane L2). On the other hand, when the driver's touch on the OK button is not detected for some reason, the control device 19 discontinues the second lane change (lane change from the lane L3 to the lane L2).

As described above, regarding the driver's intention of acceptance in response to the travel control information presented on the presentation device 15 illustrated in FIG. 4A, the second acceptance input (hereinafter also referred to as a present acceptance input) of touching the OK button set to the second input unit 152 illustrated in the right diagram of FIG. 4A is set to be different from the first acceptance input (hereinafter also referred to as a previous acceptance input) of touching the OK button set to first input unit 151 illustrated in the left diagram of FIG. 4A in terms of the input form, i.e., the input position. In other words, the OK button indicating the intention of acceptance is not set to a unique position. Therefore, the driver must check the position of the OK button that is changed each time the travel operation by the travel control such as lane change is performed, thereby preventing distraction. As a result, the driver itself becomes more aware of confirming safety and thus the ability to monitor the operation of the subject vehicle is evoked.

The left diagram of FIG. 4B illustrates the first travel control information presented on the presentation device 15 before starting the lane change from the center lane L2 to the rightmost lane L3 as illustrated in FIG. 3, while the right diagram of FIG. 4B illustrates the second travel control information presented on the presentation device 15 after the first lane change is performed and before the second lane change is started. In this example, before starting the lane change from the center lane L2 to the rightmost lane L3, as illustrated in the left diagram of FIG. 4B, the display of the presentation device 15 displays the subject vehicle $V_0$ and the front view image data including the lanes L1, L2, and L3 together with a lane change destination of the subject vehicle $V_0$, the OK button and the NG button (an input button for the input indicating that the driver does not accept the lane change control, the same shall apply hereinafter). The lane change destination of the subject vehicle $V_0$ is displayed by using a visual pattern such as an arrow. Additionally or alternatively, the presentation device 15 includes a first input unit 151 set to the first input position in the left center of FIG. 4B, and a second input unit 152 set to the second input position in the right center of FIG. 4B. The second input position is different from the first input position. In the left diagram of FIG. 4B, the OK button is set to the first input unit 151 and the NG button is set to the second input unit 152. In addition, along with this display, voice data is output from the speaker, such as "Do you accept the lane change? If you accept the lane change, please touch the OK button." Additionally or alternatively, the voice data may be displayed as character data on the display.

In response to the first travel control information illustrated in the left diagram of FIG. 4B, the driver visually checks the surrounding situation and the like by himself/herself, and in the case of determining to accept the lane change or in other similar cases, the driver touches the OK button set to the first input nit 151. This allows the control device 19 to execute the lane change control related to the first lane change (lane change from the lane L2 to the lane L3). On the other hand, when the driver's touch on the NG button is detected for some reason, the control device 19 discontinues the first lane change control (lane change from the lane L2 to the lane L3).

When the driver touches the OK button for the first travel control information illustrated in the left diagram of FIG. 4B, the control device 19 executes the lane change control related to the first lane change (lane change from the lane L2 to the lane L3). Thereafter, when a determination is made that the lane change from the rightmost lane L3 to the center lane L2 is possible, the presentation device 15 presents the second travel control information illustrated in the right diagram of FIG. 4B before starting the lane change from the rightmost lane L3 to the center lane L2. In this example, before starting the second lane change from the rightmost lane L3 to the center lane L2, as illustrated in the right diagram of FIG. 4B, the display of the presentation device 15 displays the subject vehicle $V_0$ and the front view image data including the lanes L1, L2, and L3 together with a lane change destination of the subject vehicle $V_0$, the OK button and the NG button. The lane change destination of the subject vehicle $V_0$ is displayed by using a visual pattern such as an arrow. In the right diagram of FIG. 4B, the OK button is set to the second input unit 152, and the NG button is set to the first input unit 151. In other words, the positions of the OK button and the NG button displayed on the presentation device 15 are reversed between the previous acceptance input and the present acceptance input. In addition, along with this display, voice data is output from the speaker, such as "Do you accept the lane change? If you accept the lane change, please touch the OK button." Additionally or alternatively, the voice data may be displayed as character data on the display.

In response to the second travel control information illustrated in the right diagram of FIG. 4B, the driver visually checks the surrounding situation and the like by himself/herself, and in the case of determining to accept the lane change or in other similar cases, the driver touch the OK button set to the second input unit 152. This allows the control device 19 to execute the lane change control related to the second lane change (lane change from the lane L3 to the lane L2). On the other hand, when the driver's touch on the NG button is detected for some reason, the control device 19 discontinues the second lane change (lane change from the lane L3 to the lane L2).

As described above, regarding the driver's intention of acceptance in response to the travel control information presented on the presentation device 15 illustrated in FIG. 4B, the present acceptance input of touching the OK button set to the second input unit 152 illustrated in the right diagram of FIG. 4B is set to be different from the previous acceptance input of touching the OK button set to first input unit 151 illustrated in the left diagram of FIG. 4B in terms of the input form, i.e., the input position. Regarding the driver's intention of non-acceptance in response to the travel control information presented on the presentation device 15, the acceptance input of touching the OK button set to the first input unit 151 illustrated in the right diagram of FIG. 4B is set to be different from the non-acceptance input of touching the NG button set to second input unit 152 illustrated in the left diagram of FIG. 4B in terms of the input form, i.e., the input position. In other words, the OK button indicating the intention of acceptance and the NG button indicating the intention of non-acceptance are not set to unique positions. Therefore, since the driver must check the positions of the OK button and the NG button which is changed each time the travel operation by the travel control such as the lane change is performed, the distraction is suppressed. As a result, the driver itself becomes more aware of confirming safety and thus the ability to monitor the operation of the subject vehicle is evoked.

Figure 4C:
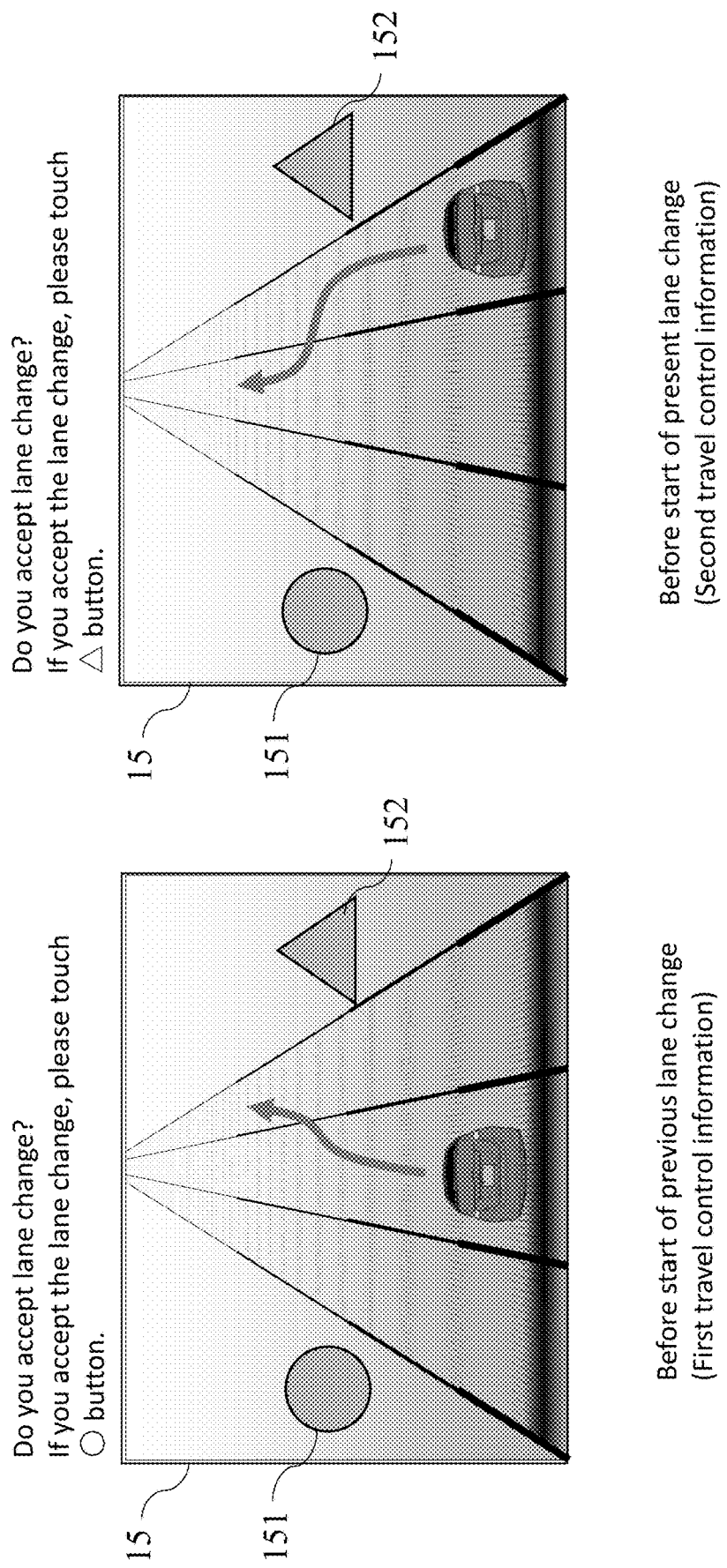
FIG. 4C is a set of diagrams illustrating a third presentation form of the lane change information presented during execution of the lane change control according to one or more embodiments of the present invention.

The left diagram of FIG. 4C illustrates the first travel control information presented on the presentation device 15 before starting the lane change from the center lane L2 to the rightmost lane L3 as illustrated in FIG. 3, while the right diagram of FIG. 4C illustrates the second travel control information presented on the presentation device 15 after the first lane change is performed and before the second lane change is started. In this example, before starting the lane change from the center lane L2 to the rightmost lane L3, as illustrated in the left diagram of FIG. 4C, the display of the presentation device 15 displays the subject vehicle $V_0$ and the front view image data including the lanes L1, L2, and L3 together with a lane change destination of the subject vehicle $V_0$, a ○ button and a Δ button. The lane change destination of the subject vehicle $V_0$ is displayed by using a visual pattern such as an arrow. Additionally or alternatively, the presentation device 15 includes a first input unit 151 set to the first input position in the left center of FIG. 4C, and a second input unit 152 set to the second input position in the right center of FIG. 4C. The second input position is different from the first input position. In the left diagram of FIG. 4C, the ○ button is set to the first input unit 151 and the Δ button is set to the second input unit 152. In addition, along with this display, voice data is output from the speaker, such as "Do you accept the lane change? If you accept the lane change, please touch the ○ button." Additionally or alternatively, the voice data may be displayed as character data on the display.

In response to the first travel control information illustrated in the left diagram of FIG. 4C, the driver visually checks the surrounding situation and the like, and in the case of determining to accept the lane change or in other similar cases, the driver touch the ○ button set to the first input unit 151. This allows the control device 19 to execute the lane change control related to the first lane change (lane change from the lane L2 to the lane L3). On the other hand, when the driver's touch on the ○ button is not detected for some reason, the control device 19 discontinues the first lane change control (lane change from the lane L2 to the lane L3).

When the driver touches the ○ button for the first travel control information illustrated in the left diagram of FIG. 4C, the control device 19 executes the lane change control related to the first lane change (lane change from the lane L2 to the lane L3). Thereafter, when a determination is made that the lane change from the rightmost lane L3 to the center lane L2 is possible, the presentation device 15 presents the second travel control information illustrated in the right diagram of FIG. 4C before starting the lane change from the rightmost lane L3 to the center lane L2. In this example, before starting the second lane change from the rightmost lane L3 to the center lane L2, as illustrated in the right diagram of FIG. 4C, the display of the presentation device 15 displays the subject vehicle $V_0$ and the front view image data including the lanes L1, L2, and L3 together with a lane change destination of the subject vehicle $V_0$, the ○ button and the Δ button. The lane change destination of the subject vehicle $V_0$ is displayed by using a visual pattern such as an arrow. In the right diagram of FIG. 4C, the ○ button is set to the first input unit 151, and the Δ button is set to the second input unit 152, just as in the left diagram of FIG. 4C. In addition, along with this display, voice data is output from the speaker, such as "Do you accept the lane change? If you accept the lane change, please touch the Δ button." In other words, the previous acceptance illustrated in the left diagram is the input form of touching the ○ button, but the present acceptance illustrated in the right diagram is the input form of touching the Δ button. Additionally or alternatively, the voice data may be displayed as character data on the display.

In response to the second travel control information illustrated in the right diagram of FIG. 4C, the driver visually checks the surrounding situation and the like by himself/herself, and in the case of determining to accept the lane change or in other similar cases, the driver touches the Δ button set to the second input unit 152. This allows the control device 19 to execute the lane change control related to the second lane change (lane change from the lane L3 to the lane L2). On the other hand, when the driver's ouch on the Δ button is not detected for some reason, the control device 19 discontinues the second lane change (lane change from the lane L3 to the lane L2).

As described above, regarding the driver's intention of acceptance in response to the travel control information presented on the presentation device 15 illustrated in FIG. 4C, the present acceptance input of touching the Δ button set to the second input unit 152 illustrated in the right diagram of FIG. 4C is set to be different from the previous acceptance input of touching the ○ button set to first input unit 151 illustrated in the left diagram of FIG. 4C in terms of the input form, i.e., the input position. In other words, the display positions of the ○ button and the Δbutton is the same but the button indicating the intention of acceptance is not set to a unique position. Therefore, since the driver must check the position of the ○ button or the Δ button which is changed each time the travel operation by the travel control such as the lane change is performed, the distraction is suppressed. As a result, the driver itself becomes more aware of confirming safety and thus the ability to monitor the operation of the subject vehicle is evoked.

The left diagram of FIG. 4D illustrates the first travel control information presented on the presentation device 15 before starting the lane change from the center lane L2 to the rightmost lane L3 as illustrated in FIG. 3, while the right diagram of FIG. 4D illustrates the second travel control information presented on the presentation device 15 after the first lane change is performed and before the second lane change is started. In this example, before starting the lane change from the center lane L2 to the rightmost lane L3, as illustrated in the left diagram of FIG. 4D, the display of the presentation device 15 displays the subject vehicle $V_0$ and the front view image data including the lanes L1, L2, and L3 together with a lane change destination of the subject vehicle $V_0$ and a plurality of ○ buttons (corresponding to the first input unit 151) arranged in a row. The lane change destination of the subject vehicle $V_0$ is displayed by using a visual pattern such as an arrow. In addition, along with this display, voice data is output from the speaker, such as "Do you accept the lane change? If you accept the lane change, please touch the ○ buttons while sliding your finger to the right." Additionally or alternatively, the voice data may be displayed as character data on the display.

In response to the first travel control information illustrated in the left diagram of FIG. 4D, the driver visually checks the surrounding situation and the like, and in the case of determining to accept the lane change or in other similar cases, the driver touch the ○ buttons being set to the first input unit 151 while sliding the finger to the right. This allows the control device 19 to execute the lane change control related to the first lane change (lane change from the lane L2 to the lane L3). On the other hand, when the driver's touch on the ○ buttons while sliding the finger to the right is not detected for some reason, the control device 19 discontinues the first lane change control (lane change from the lane L2 to the lane L3).

When the driver touches the ○ buttons while sliding your finger to the right in response to the first travel control information illustrated in the left diagram of FIG. 4D, the control device 19 executes the lane change control related to the first lane change (lane change from the lane L2 to the lane L3). Thereafter, when a determination is made that the lane change from the rightmost lane L3 to the center lane L2 is possible, the presentation device 15 presents the second travel control information illustrated in the right diagram of FIG. 4D before starting the lane change from the rightmost lane L3 to the center lane L2. In this example, before starting the lane change from the rightmost lane L3 to the center lane L2, as illustrated in the right diagram of FIG. 4D, the display of the presentation device 15 displays the subject vehicle $V_0$ and the front view image data including the lanes L1, L2, and L3 together with a lane change destination of the subject vehicle $V_0$ and a plurality of ○ buttons (corresponding to the first input unit 151) arranged in a row. The lane change destination of the subject vehicle $V_0$ is displayed by using a visual pattern such as an arrow. In addition, along with this display, voice data is output from the speaker, such as "Do you accept the lane change? If you accept the lane change, please touch the ○ buttons while sliding your finger to the left." Additionally or alternatively, the voice data may be displayed as character data on the display.

In response to the second travel control information illustrated in the right diagram of FIG. 4D, the driver visually checks the surrounding situation and the like, and in the case of determining to accept the lane change or in other similar cases, the driver touch the ○ buttons being set to the first input unit 151 while sliding the finger to the left. This allows the control device 19 to execute the lane change control related to the second lane change (lane change from the lane L3 to the lane L2). On the other hand, when the driver's touch on the ○ buttons while sliding the finger to the left is not detected for some reason, the control device 19 discontinues the second lane change control (lane change from the lane L3 to the lane L2).

As described above, regarding the driver's intention of acceptance in response to the travel control information presented on the presentation device 15 illustrated in FIG. 4D, the present acceptance input of touching the ○ buttons being set to the first input unit 151 illustrated in the right diagram of FIG. 4D is set to be different from the previous acceptance input of touching the 0 buttons being set to first input unit 151 illustrated in the left diagram of FIG. 4D in terms of the input form, i.e., the input method. In other words, the input method for the driver to indicate the intention of acceptance is not set to a unique method. Therefore, since the driver must check the input method of the ○ button which is changed each time the travel operation by the travel control such as the lane change is performed, the distraction is suppressed. As a result, the driver itself becomes more aware of confirming safety and thus the ability to monitor the operation of the subject vehicle is evoked.

The left diagram of FIG. 4E illustrates the first travel control information presented on the presentation device 15 before starting the lane change from the center lane L2 to the rightmost lane L3 as illustrated in FIG. 3, while the right diagram of FIG. 4E illustrates the second travel control information presented on the presentation device 15 after the first lane change is performed and before the second lane change is started. In this example, before starting the lane change from the center lane L2 to the rightmost lane L3, as illustrated in the left diagram of FIG. 4E, the display of the presentation device 15 displays the subject vehicle $V_0$ and the front view image data including the lanes L1, L2, and L3 together with a lane change destination of the subject vehicle $V_0$ by using a visual pattern such as an arrow. Additionally or alternatively, a specified button provided on the steering (a first input device) and a blinker lever (a second input device) are set as the input device for receiving the input of the driver's intention of the acceptance. In addition, along with this display, voice data is output from the speaker, such as "Do you accept the lane change? If you accept the lane change, please touch the steering button." Additionally or alternatively, the voice data may be displayed as character data on the display. In addition, the input device may be the steering button, the blinker lever, or other input devices operated by the driver, such as various buttons on a navigation device, various buttons on an audio device, and various buttons on an air conditioning device. The input device may also be an in-car camera which detects the driver's gestures, or a microphone which detects the driver's voice indicating acceptance for voice recognition.

In response to the first travel control information illustrated in the left diagram of FIG. 4E, the driver visually checks the surrounding situation and the like, and in the case of determining to accept the lane change or in other similar cases, the driver touch the steering button set as the first input device. This allows the control device 19 to execute the lane change control related to the first lane change (lane change from the lane L2 to the lane L3). On the other hand, when the driver's input on the steering button is not detected for some reason, the control device 19 discontinues the first lane change control (lane change from the lane L2 to the lane L3).

When the driver touches the steering button in response to the first travel control information illustrated in the left diagram of FIG. 4E, the control device 19 executes the lane change control related to the first lane change (lane change from the lane L2 to the lane L3). Thereafter, when a determination is made that the lane change from the rightmost lane L3 to the center lane L2 is possible, the presentation device 15 presents the second travel control information illustrated in the right diagram of FIG. 4E before starting the lane change from the rightmost lane L3 to the center lane L2. In this example, before starting the lane change from the rightmost lane L3 to the center lane L2, as illustrated in the right diagram of FIG. 4E, the display of the presentation device 15 displays the subject vehicle $V_0$ and the front view image data including the lanes L1, L2, and L3 together with a lane change destination of the subject vehicle $V_0$ by using a visual pattern such as an arrow. In addition, along with this display, voice data is output from the speaker, such as "Do you accept the lane change? If you accept the lane change, please operate the blinker lever." Additionally or alternatively, the voice data may be displayed as character data on the display.

In response to the second travel control information illustrated in the right diagram of FIG. 4E, the driver visually checks the surrounding situation and the like, and in the case of determining to accept the lane change or in other similar cases, the driver operates the blinker lever set as the second input device. This allows the control device 19 to execute the lane change control related to the second lane change (lane change from the lane L3 to the lane L2). On the other hand, when the driver's operation of the blinker lever is not detected for some reason, the control device 19 discontinues the second lane change (lane change from the lane L3 to the lane L2).

As described above, regarding the driver's intention of acceptance in response to the travel control information presented on the presentation device 15 illustrated in FIG. 4E, the present acceptance input of operating the blinker lever set as the second input device illustrated in the right diagram of FIG. 4E is set to be different from the previous acceptance input of touching the steering button set as the first input device illustrated in the left diagram of FIG. 4E in terms of the input form, i.e., the input device. In other words, the input device for the driver to indicate the intention of acceptance is not set to a unique device. Therefore, since the driver must check the input device which is changed each time the travel operation by the travel control such as the lane change is performed, the distraction is suppressed. As a result, the driver itself becomes more aware of confirming safety and thus the ability to monitor the operation of the subject vehicle is evoked.

The number of the lane change in FIG. 4A to FIG. 4E are two, but the acceptance action of the driver for the third and subsequent travel control changes may be an input form which is different from the previous input form. Additionally or alternatively, in one or more embodiments of the present invention, in principle, the input form of the present acceptance input by the driver in response to the shift to the second travel control is set to a form different from the input form of the previous acceptance input by the driver in response to the shift to the first travel control, but when a degree of urgency of the present acceptance input by the driver is equal to or greater than a predetermined threshold value, the input form of the present acceptance input may be set to the same form as the input form of the previous acceptance input, instead of being set an input form different from the input form of the previous acceptance input. The degree of urgency determination function of the control device 19 illustrated in FIG. 1 is a function of determining whether or not the degree of the urgency of the present acceptance input by the driver is equal to or greater than a predetermined threshold value, and when the degree of urgency of the acceptance input is equal to or greater than the threshold value, instead of setting the input form of the present acceptance input to an input form different from the input form of the previous acceptance input, setting the same form as an input form of the previous acceptance input.

A case where the degree of urgency of the acceptance input by the driver is greater is, for example, when the distance to an interchange turnoff, entry to a servicing area, or exit from a freeway is short and there is not enough time to shift the vehicle's travel control. The case also includes environments where the detection accuracy of the surroundings of the vehicle by the sensor 11 is often low, such as in bad weather, and the reliability of the autonomous travel control by the vehicle's travel control apparatus 1 drops below a certain threshold. When there is enough time to shift to travel control of the vehicle, or when the reliability of the autonomous travel control is high, the driver is less distracting and less monitoring of the vehicle. Therefore, the travel control apparatus 1 for the vehicle according to one or more embodiments of the present invention in principle, the input form of the present acceptance input by the driver in response to the shift to the second travel control is set to a input form different from the input form of the previous acceptance input by the driver in response to the shift to the first travel control, but when the degree of urgency of the acceptance input by the driver is equal to or greater than a predetermined threshold value in the situation described above, the input form of the present acceptance input may be set to the same form as the input form of the previous acceptance input in order to give priority to the prompt indication by the driver. This allows the driver to focus on monitoring the vehicle without allowing extra attention to the input form of the present acceptance input.

A lane change control process according to one or more embodiments of the present invention will now be described with reference to FIGS. 5A to 5E. FIGS. 5A to 5E are flowcharts illustrating the lane change control process according to one or more embodiments of the present invention. The lane change control process described below is executed by the control device 19 at predetermined time intervals. In the following, the scene of the lane change by the travel control function of the control device 19 illustrated in FIG. 3 will be explained assuming that the lane keeping control is performed to control the travel position of the subject vehicle $V_0$ in the width direction of the subject lane L2 so that the subject vehicle $V_0$ travels in the subject lane L2, and that when overtaking another vehicle $V_1$ ahead, the subject vehicle $V_0$ overtakes another vehicle $V_1$ while traveling in the lane L3, and then returns to the subject lane L2.

Figure 5A:
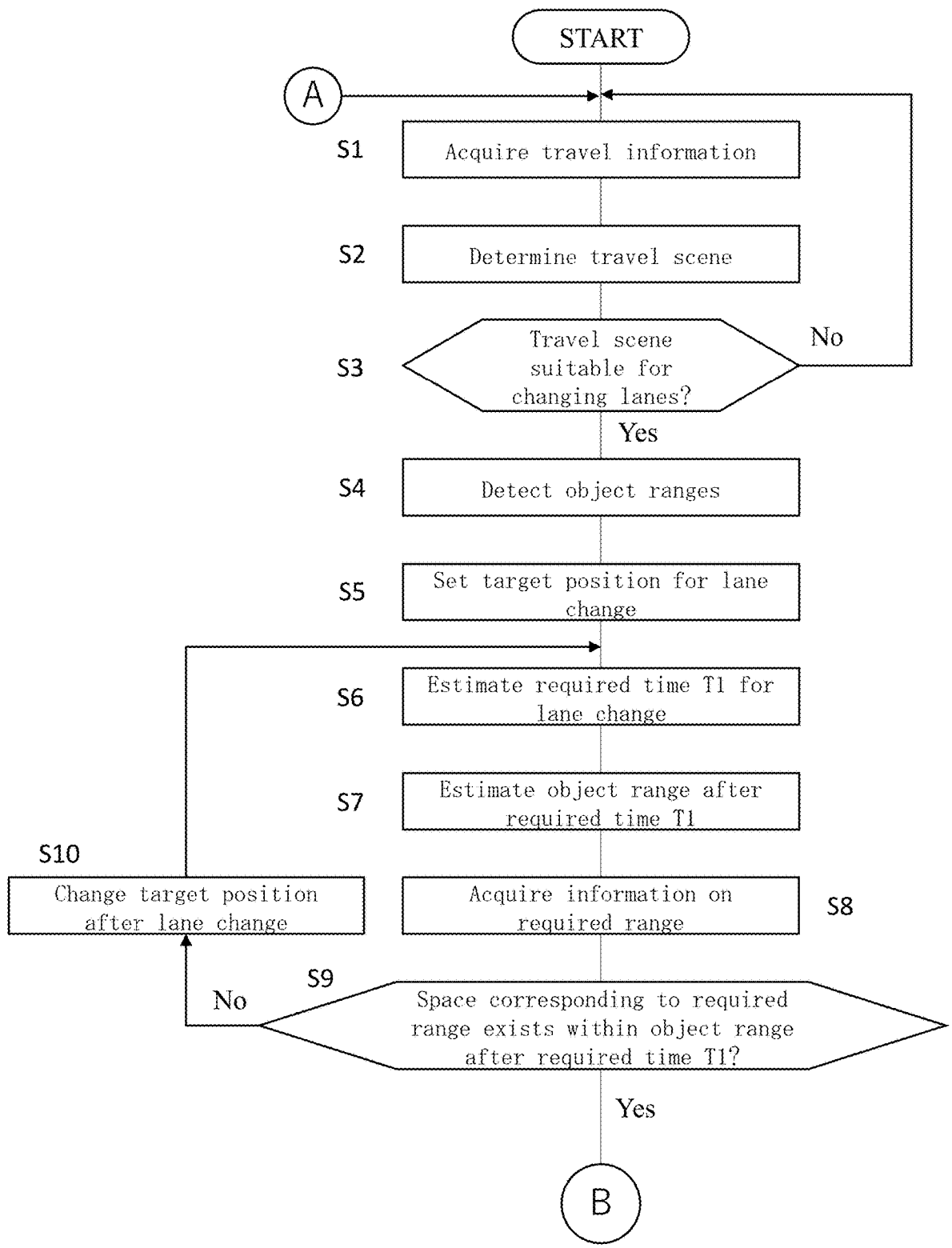
FIG. 5A is a flowchart (part 1) illustrating a lane change control process executed by the travel control apparatus for a vehicle according to the present invention.

First, in step S1 of FIG. 5A, the control device 19 uses the travel information acquisition function to acquire the travel information regarding the traveling state of the subject vehicle. Step S1 is followed by step S2, in which the control device 19 uses the travel scene determination function to determine the travel scene of the subject vehicle on the basis of the travel information acquired in step S1.

In step S3, the control device 19 uses the travel scene determination function to determine whether or not the travel scene of the subject vehicle determined in step S2 is a travel scene suitable for changing lanes. Specifically, when the travel scene of the subject vehicle is any of travel scenes illustrated in FIG. 2, the travel scene determination function is used to determine that the travel scene of the subject vehicle is a travel scene suitable for changing lanes. When the travel scene of the subject vehicle is not a travel scene suitable for changing lanes, the process returns to step S1, from which the determination of the travel scene is repeated. When the travel scene of the subject vehicle is a travel scene suitable for changing lanes, the process proceeds to step S4.

In step S4, the control device 19 uses the lane change control function to detect object ranges. Specifically, the control device 19 uses the lane change control function to detect obstacles existing around the subject vehicle on the basis of the external image information around the vehicle captured by the front camera and rear camera included in the sensors 11 and/or the travel information including the detection results by the front radar, rear radar, and side radars included in the sensors 11. Then, the control device 19 uses the lane change control function to detect ranges that are located on a side of the subject vehicle and in which no obstacles exist, as the object ranges.

The "object ranges" in one or more embodiments of the present invention refer to relative ranges with reference to the traveling position when the subject vehicle travels at the current speed; therefore, when another vehicle existing around the subject vehicle travels straight ahead at the same speed as the subject vehicle, the object ranges do not vary. The "side of the subject vehicle" refers to a range in which the position on the side of the subject vehicle can be taken as a target position for changing lane when the subject vehicle changes lane (this target position is also a relative position with reference to the traveling position when the subject vehicle travels at the current speed), and this range (such as direction, size, and angle) can be set as appropriate. Methods of detecting object ranges OS will be described below with reference to FIGS. 6A to 6F. FIGS. 6A to 6F are plan views for explaining object ranges OS.

Figure 6A:
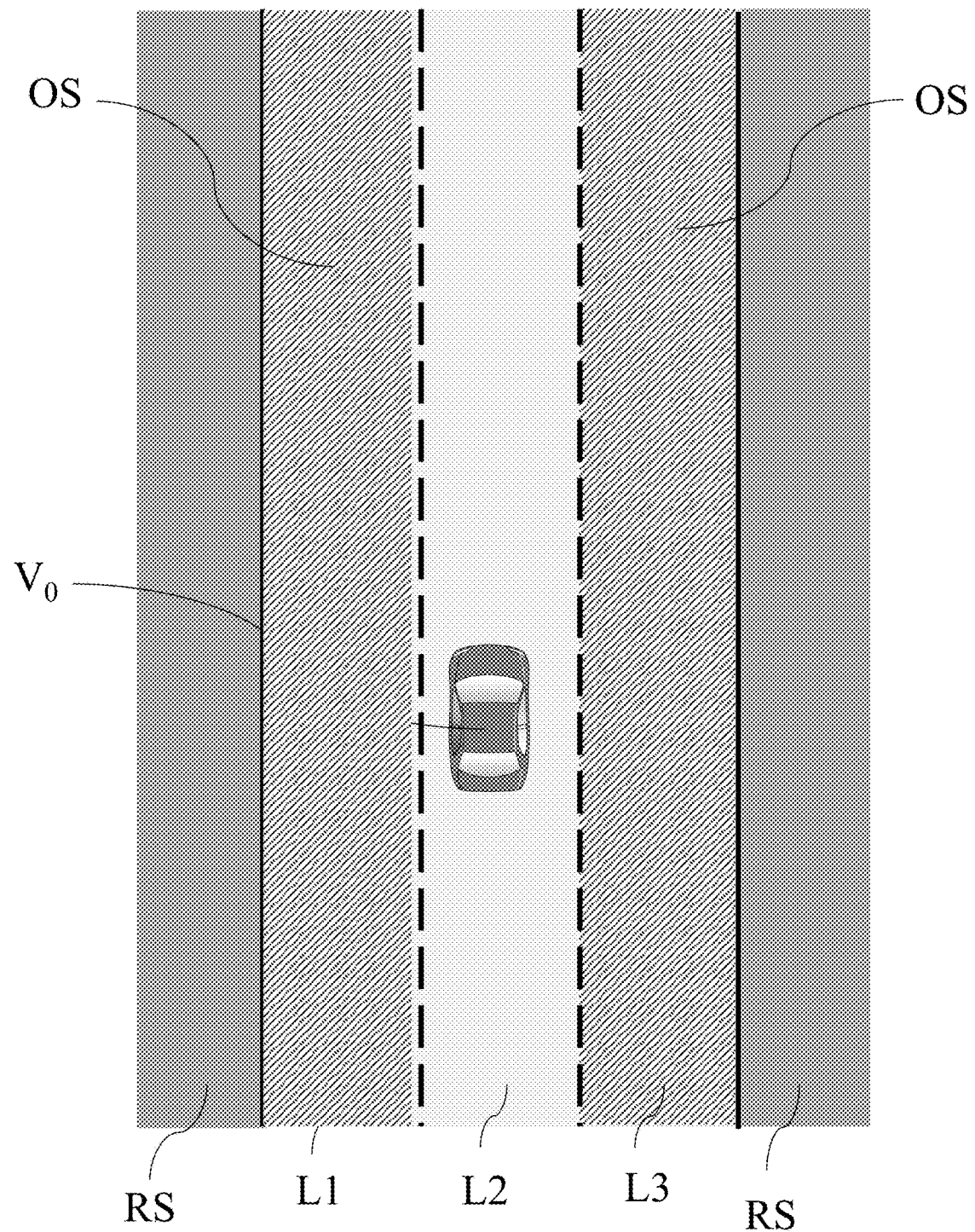
FIG. 6A is a plan view (part 1) for describing a method of detecting object ranges executed by the travel control apparatus for a vehicle according to the present invention.

In an example of a scene illustrated in FIG. 6A, another vehicle $V_1$ that is an obstacle does not exist neither in the left and right adjacent lanes L1, L3 respectively adjacent to a lane L2 in which the subject vehicle $V_0$ travels. In this case, the control device 19 uses the lane change control function to detect the adjacent lane L1 and L3 as object ranges OS. Note that road shoulders RS are excluded from the object ranges OS because the road shoulders RS are basically within ranges in which changing lanes cannot be performed. Note, however, that when the travel scene of the subject vehicle $V_0$ is an "emergency evacuation scene" on a road on which emergency stop or the like is permitted at the road shoulders RS, the road shoulders RS can be included in the object ranges OS (here and hereinafter).

Figure 6B:
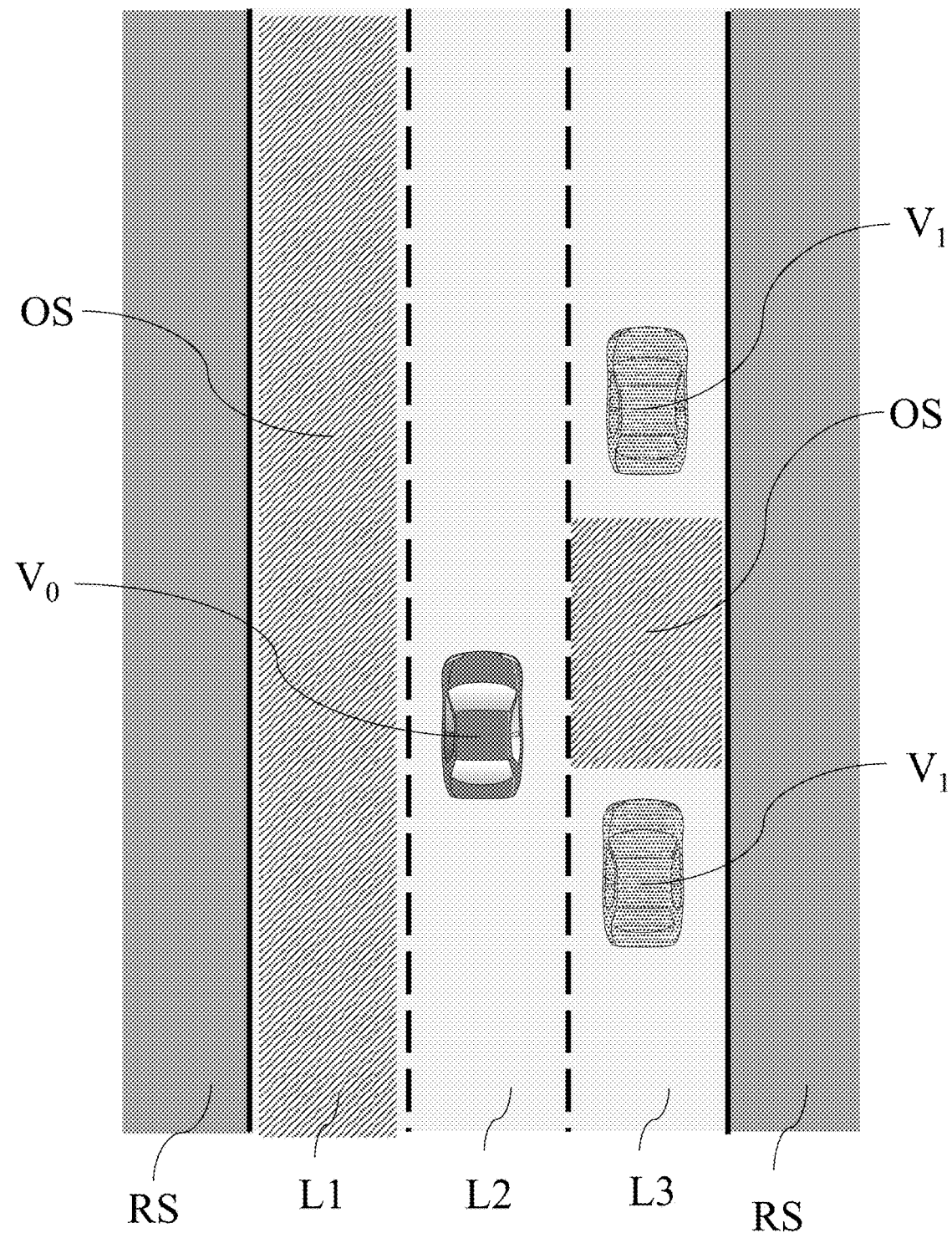
FIG. 6B is a plan view (part 2) for describing a method of detecting object ranges executed by the travel control apparatus for a vehicle according to the present invention.

In an example of a scene illustrated in FIG. 6B, another vehicle $V_1$ does not exist in the left adjacent lane L1 adjacent to the lane L2 in which the subject vehicle $V_0$ is traveling, but another vehicle $V_1$ and $V_1$ that are obstacles exist in the right adjacent lane L3. However, a range in which no other vehicles exist is present in the adjacent lane L3 between the front other vehicle $V_1$ traveling ahead of a space adjacent to the lane L2 in which the subject vehicle $V_0$ travels and the rear other vehicle $V_1$ traveling behind that space. The control device 19 uses the lane change control function to detect, as the object ranges OS, the left adjacent lane L1 and the range of the right adjacent lane L3 in which no other vehicles exist.

Figure 6C:
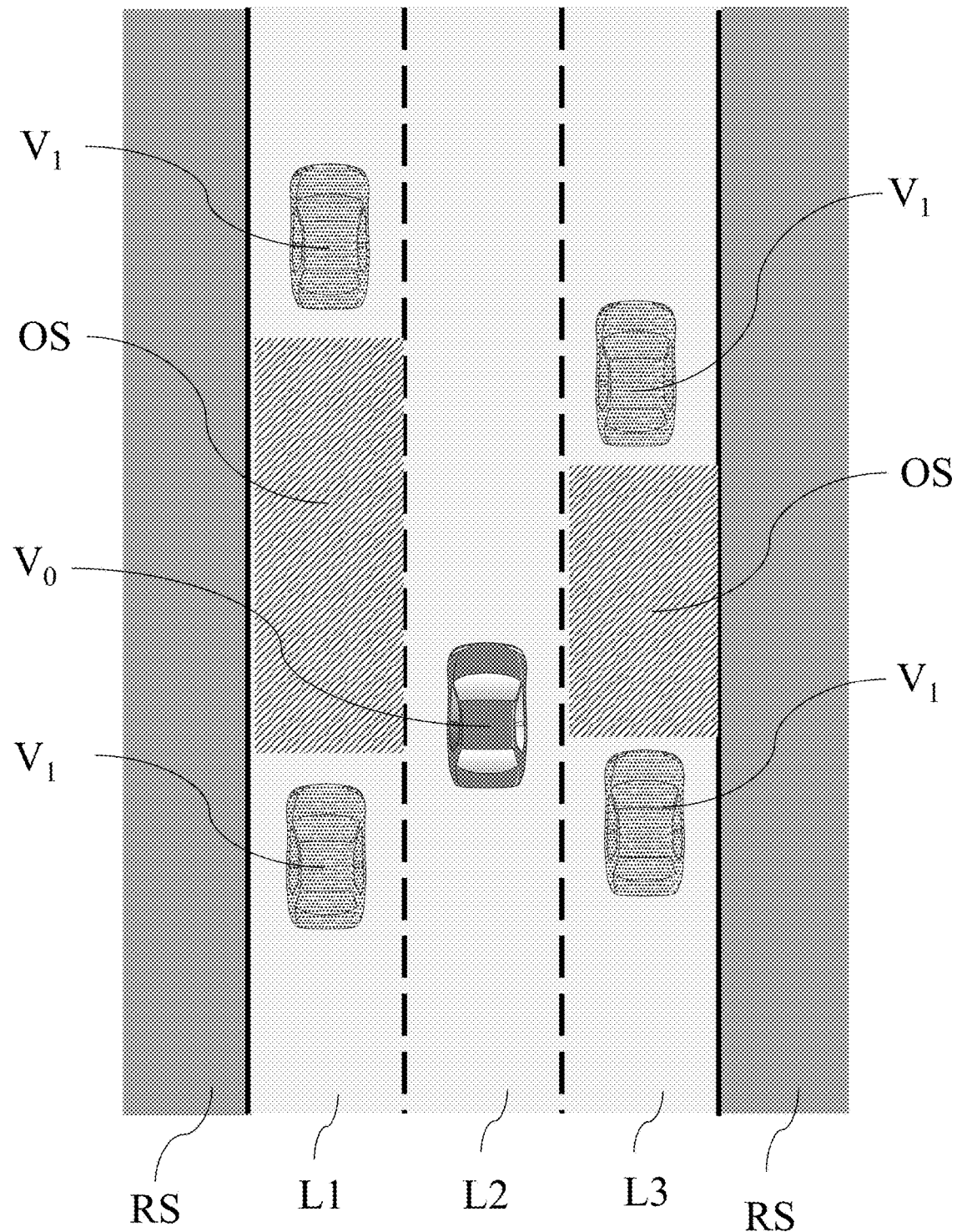
FIG. 6C is a plan view (part 3) for describing a method of detecting object ranges executed by the travel control apparatus for a vehicle according to the present invention.

In an example of a scene illustrated in FIG. 6C, a range in which no other vehicles exist is present in the right adjacent lane L3 as in the example illustrated in FIG. 6B, and a range in which no other vehicles exist is also present in the left adjacent lane L1 between the front other vehicle $V_1$ and the rear other vehicle $V_1$. In this case, the control device 19 uses the lane change control function to detect, as the object ranges OS, the range in the left adjacent lane L1 in which no other vehicles exist and the range in the right adjacent lane L3 in which no other vehicles exist.

Figure 6D:
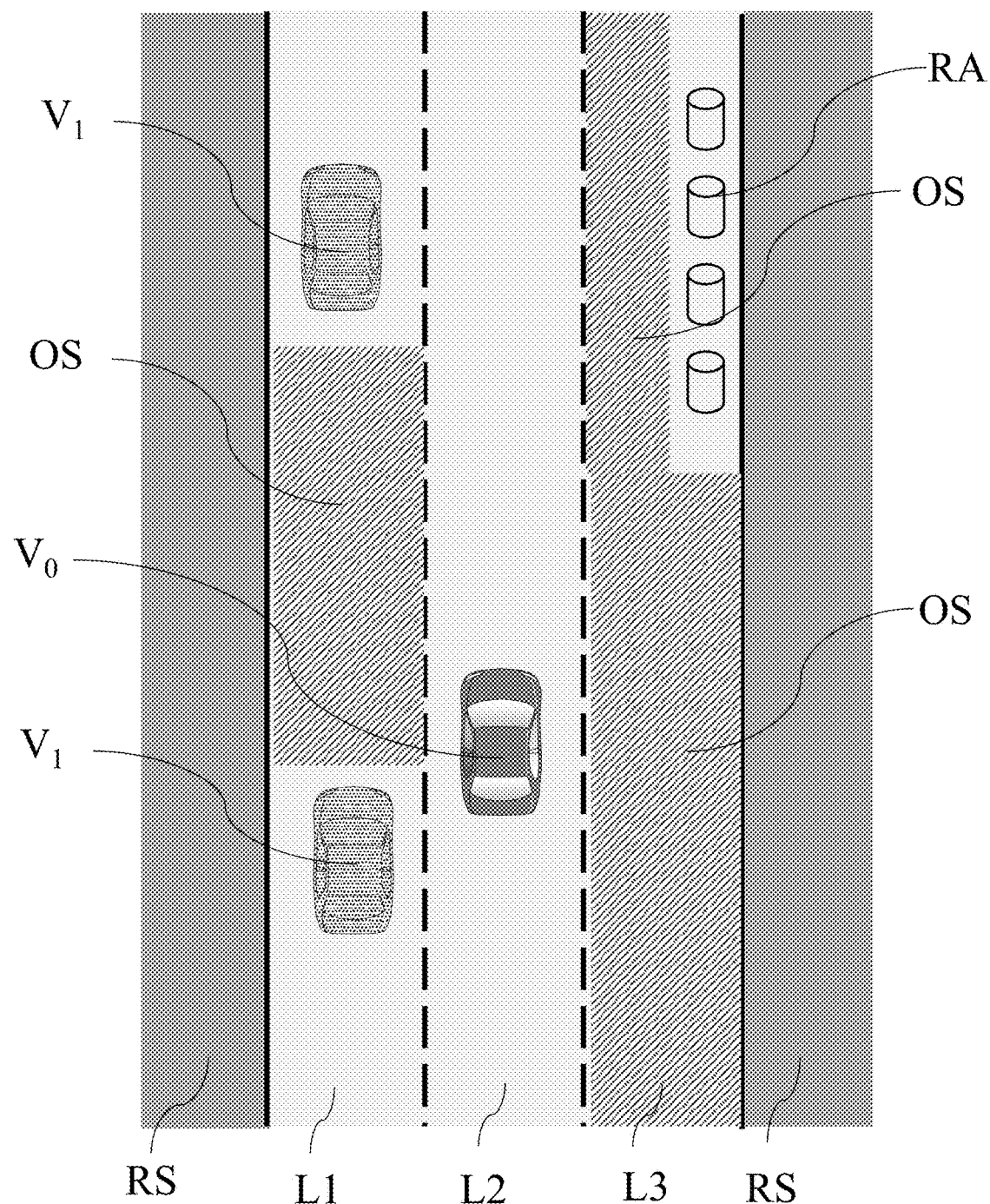
FIG. 6D is a plan view (part 4) for describing a method of detecting object ranges executed by the travel control apparatus for a vehicle according to the present invention.

In an example of a scene illustrated in FIG. 6D, a range in which no other vehicles exist is present in the left adjacent lane L1 as in the example illustrated in FIG. 6C, and no other vehicles exist in the right adjacent lane L3, but the adjacent lane L3 includes a range RA, such as a construction section or a space occupied by a damaged vehicle, in which the subject vehicle $V_0$ cannot travel. In this case, the control device 19 uses the lane change control function to detect the object ranges OS by excluding the range RA, such as a construction section or a space occupied by a damaged vehicle, in which the subject vehicle $V_0$ cannot travel, from the object ranges OS. Examples of the range RA in which the subject vehicle $V_0$ cannot travel include, in addition to a construction section, a range in which another vehicle $V_1$ parks or stops and a range in which vehicles are prohibited from traveling due to traffic regulation or the like. As illustrated in FIG. 6D, when the range RA in which the subject vehicle $V_0$ cannot travel due to a construction section or the like occupies half or more of the adjacent lane L3 (half or more in the road width direction), for example, the remaining less than half of the range may be excluded from the object ranges OS.

Figure 6E:
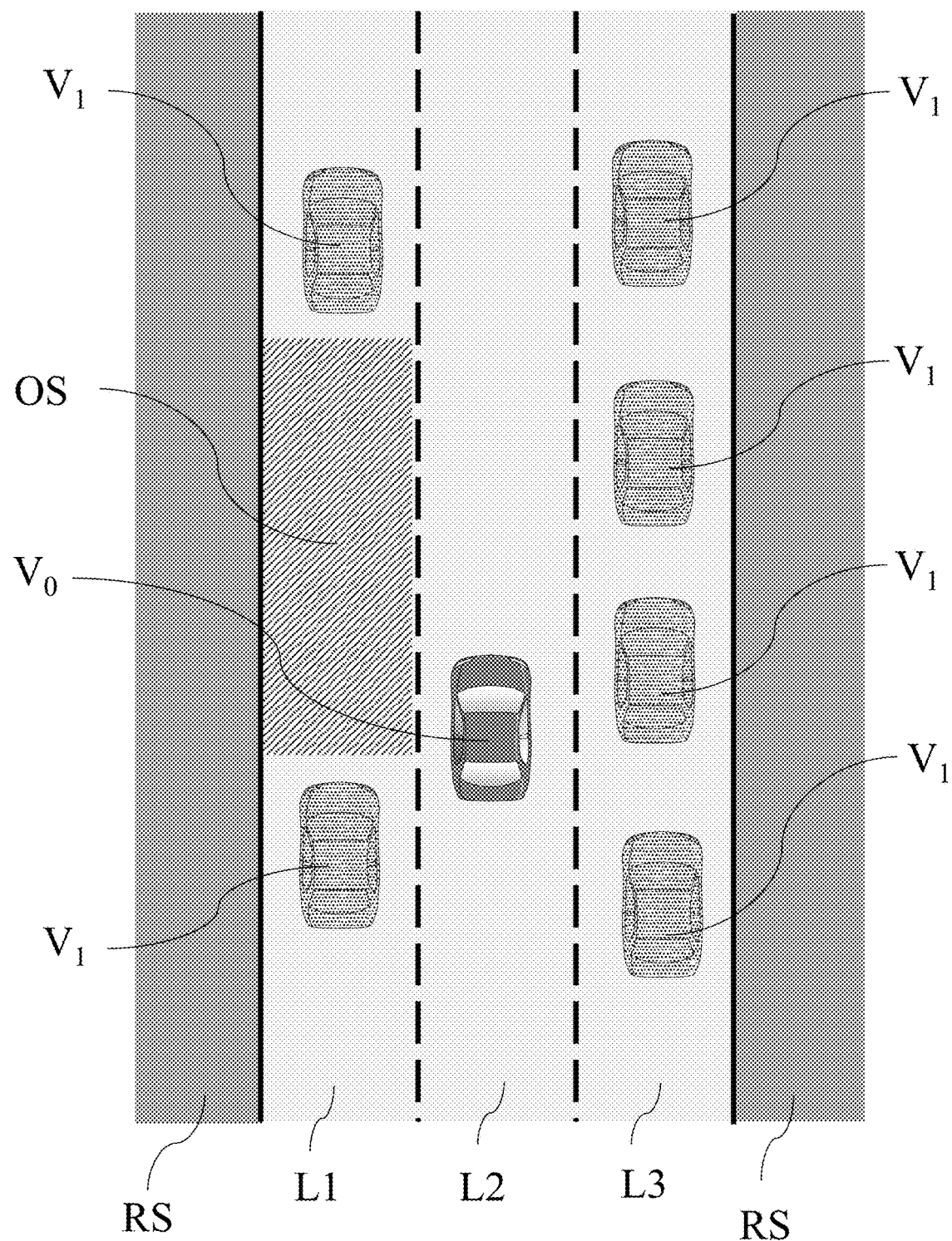
FIG. 6E is a plan view (part 5) for describing a method of detecting object ranges executed by the travel control apparatus for a vehicle according to the present invention.

In an example of a scene illustrated in FIG. 6E, a range in which no other vehicles exist is present in the left adjacent lane L1, but other vehicles $V_1$ are traveling in series in the right adjacent lane L3, and the adjacent lane L3 does not include a space to which changing lanes is possible. In this case, the control device 19 uses the lane change control function to determine that the object ranges OS cannot be detected in the right adjacent lane L3.

Figure 6F:
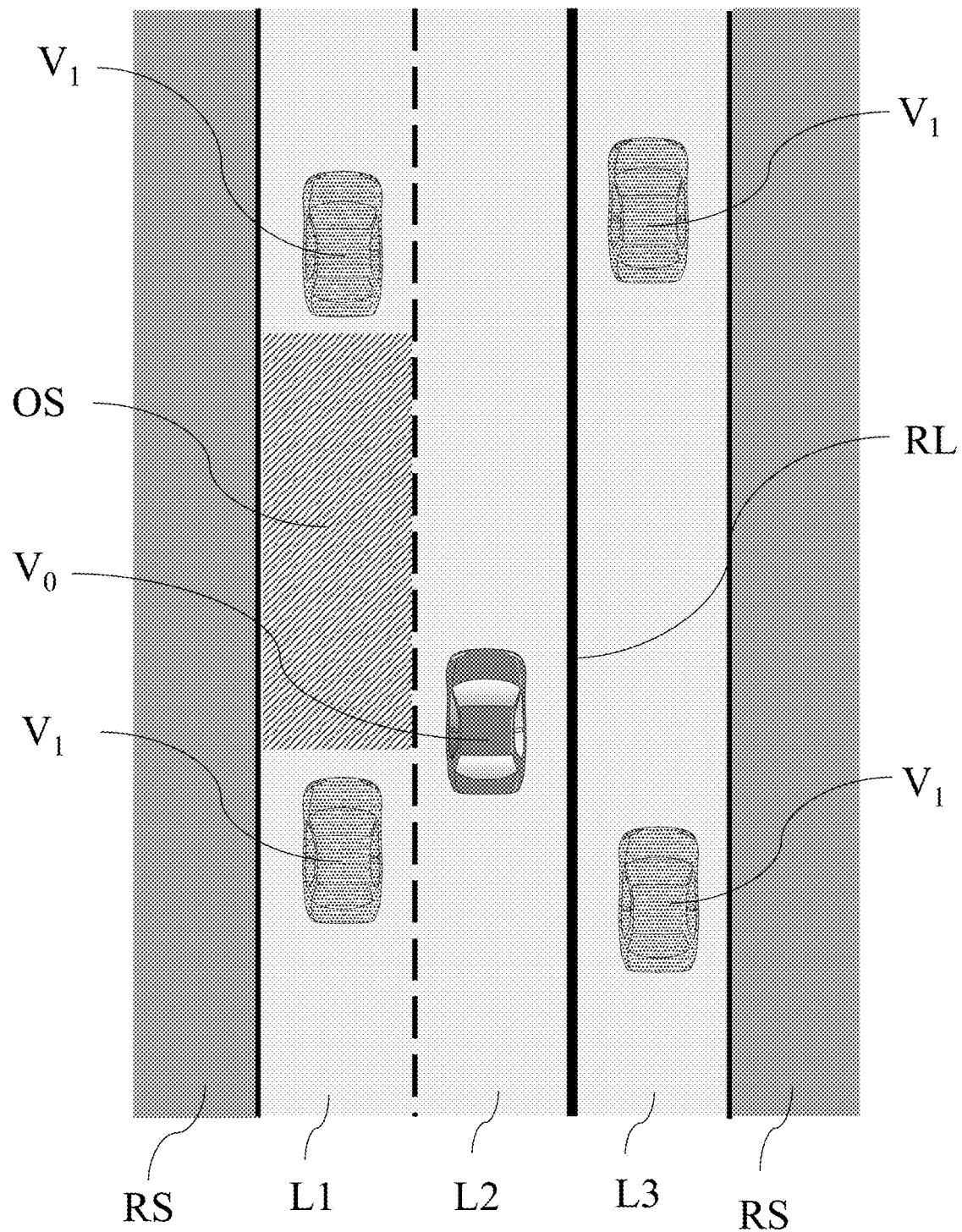
FIG. 6F is a plan view (part 6) for describing a method of detecting object ranges executed by the travel control apparatus for a vehicle according to the present invention.

In an example of a scene illustrated in FIG. 6F, lane change from the adjacent lane L2 to the next adjacent lane L3 is prohibited by a mark RL indicating the prohibition of lane change. On such a road, the control device 19 uses the lane change control function to determine that the object ranges OS cannot be detected in the right adjacent lane L3.

The control device 19 in one or more embodiments of the present invention uses the lane change control function to detect the object ranges OS in a direction, among right and left directions, which is suitable for changing lanes in the travel scene of the subject vehicle $V_0$. In one or more embodiments of the present invention, the direction suitable for changing lanes in each travel scene is preliminarily stored in the table illustrated in FIG. 2. The control device 19 uses the lane change control function to refer to the table illustrated in FIG. 2 to acquire information on the "direction of changing lanes" in the travel scene of the subject vehicle. For example, when the travel scene of the subject vehicle is a "scene of overtaking the preceding vehicle," the control device 19 uses the lane change control function to refer to the table of FIG. 2 to acquire a direction "toward the lane side for overtaking" as the "direction of changing lanes." Then, the control device 19 uses the lane change control function to detect the object ranges OS in the acquired "direction of changing lanes."

Additionally or alternatively, the control device 19 uses the lane change control function to detect the object ranges OS on a side of the subject vehicle $V_0$. For example, even when ranges in which no obstacles exist are detected in the left adjacent lane L1 and the right adjacent lane L3, if the ranges are separate from the current position of the subject vehicle $V_0$ by a certain distance or more and located behind or ahead of the subject vehicle, it may be difficult to change lanes to such ranges, which are therefore not detected as the object ranges OS.

Figure 7:
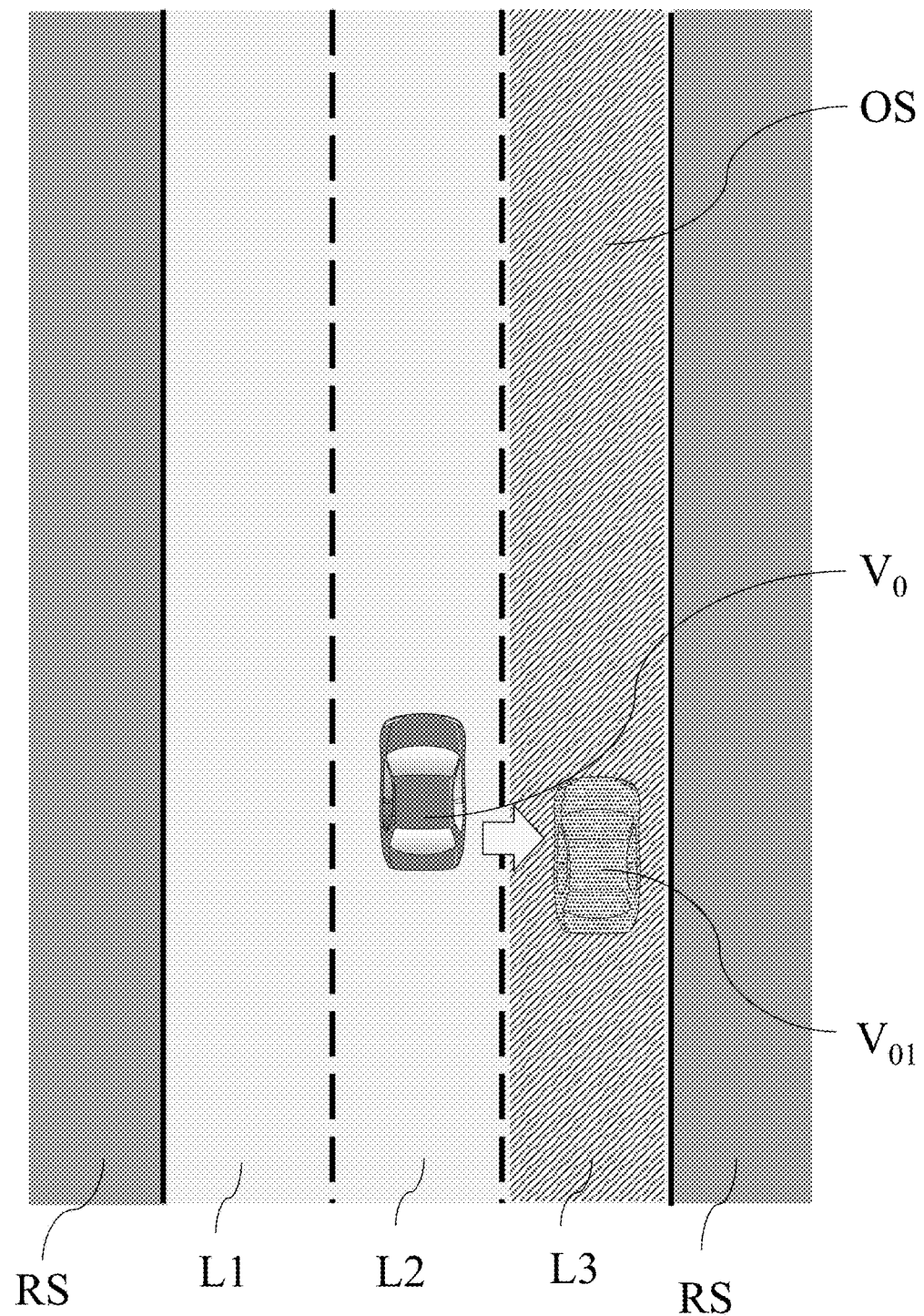
FIG. 7 is a plan view for describing a method of setting target position for lane change, wherein the method is executed by the travel control apparatus for a vehicle according to the present invention.

Referring again to FIG. 5A, in step S5, the control device 19 uses the lane change control function to set target position for lane change. FIG. 7 is a diagram for describing a method of setting the target position for lane change. For example, as illustrated in FIG. 7, the control device 19 uses the lane change control function to set a position that is within the object range OS in the right adjacent lane L3 detected in step S4 and that is shifted backward from the position of the subject vehicle $V_0$ by a small distance, as the target position for lane change (e.g., the position of vehicle Vo1 illustrated in FIG. 7). The target position for lane change (position of the vehicle Vo1) are relative positions with respect to the position at which the subject vehicle $V_0$ travels. That is, provided that the position when the subject vehicle $V_0$ travels at the current speed without changing the speed is a reference position, positions located laterally behind the reference position by a small distance are set as the target position for lane change. This allows the subject vehicle $V_0$ to change lane to the right adjacent lane L3 without accelerating the subject vehicle $V_0$ when the subject vehicle $V_0$ moves to the target position for lane change.

The control device 19 may use the lane change control function to set the target position for lane change by taking into account the ease of lane changes, such as a situation that the object ranges OS in the right adjacent lane L3 include a range to which the subject vehicle $V_0$ can move and a situation that another vehicle $V_1$ that may enter an object range OS does not exist around the subject vehicle $V_0$. For example, when another vehicle $V_1$ existing around an object range OS lights the blinkers toward the object range OS and/or travels while deviating toward the object range OS side, the lane change control function is used to determine that the other vehicle $V_1$ may enter the object range OS. In this case, another position in an object range OS which the other vehicle $V_1$ is less likely to enter may be set as the target position. In the above exemplary case, the target position for lane change is set at positions located behind the subject vehicle $V_0$ and within the object ranges OS in the adjacent lane L3. In an alternative embodiment, the target position for lane change may be set at positions located ahead of the subject vehicle $V_0$ and within the object ranges OS in the adjacent lane L3. In an alternative embodiment, step S5 may include setting target route for performing lane change instead of setting the target position for lane change.

Referring again to FIG. 5A, in step S6, the control device 19 uses the lane change control function to estimate a required time T1 for the lane changes. For example, the control device 19 uses the lane change control function to estimate a time required for the subject vehicle to move from the current position to a target position for the lane change as the required time T1 on the basis of the vehicle speed and/or acceleration of the subject vehicle. Accordingly, when the width of a lane is wide, when the road is congested, or when successive lane changes are performed as in this example, for example, the required time T1 is estimated as a long time.

In step S7, the control device 19 uses the lane change control function to estimate an object range OS after the required time T1 estimated in step S6. Specifically, the control device 19 uses the lane change control function to estimate the traveling position after the required time T1 of another vehicle $V_1$ existing around the subject vehicle $V_0$ on the basis of the vehicle speed and acceleration of the other vehicle $V_1$. For example, the control device 19 uses the lane change control function to repeatedly detect the positional information of the other vehicle $V_1$ thereby to calculate the speed vector $v_0$, acceleration vector $a_0$, and positional vector $p_0$ of the other vehicle $V_1$, as illustrated in FIG. 8A.

Figure 8A:
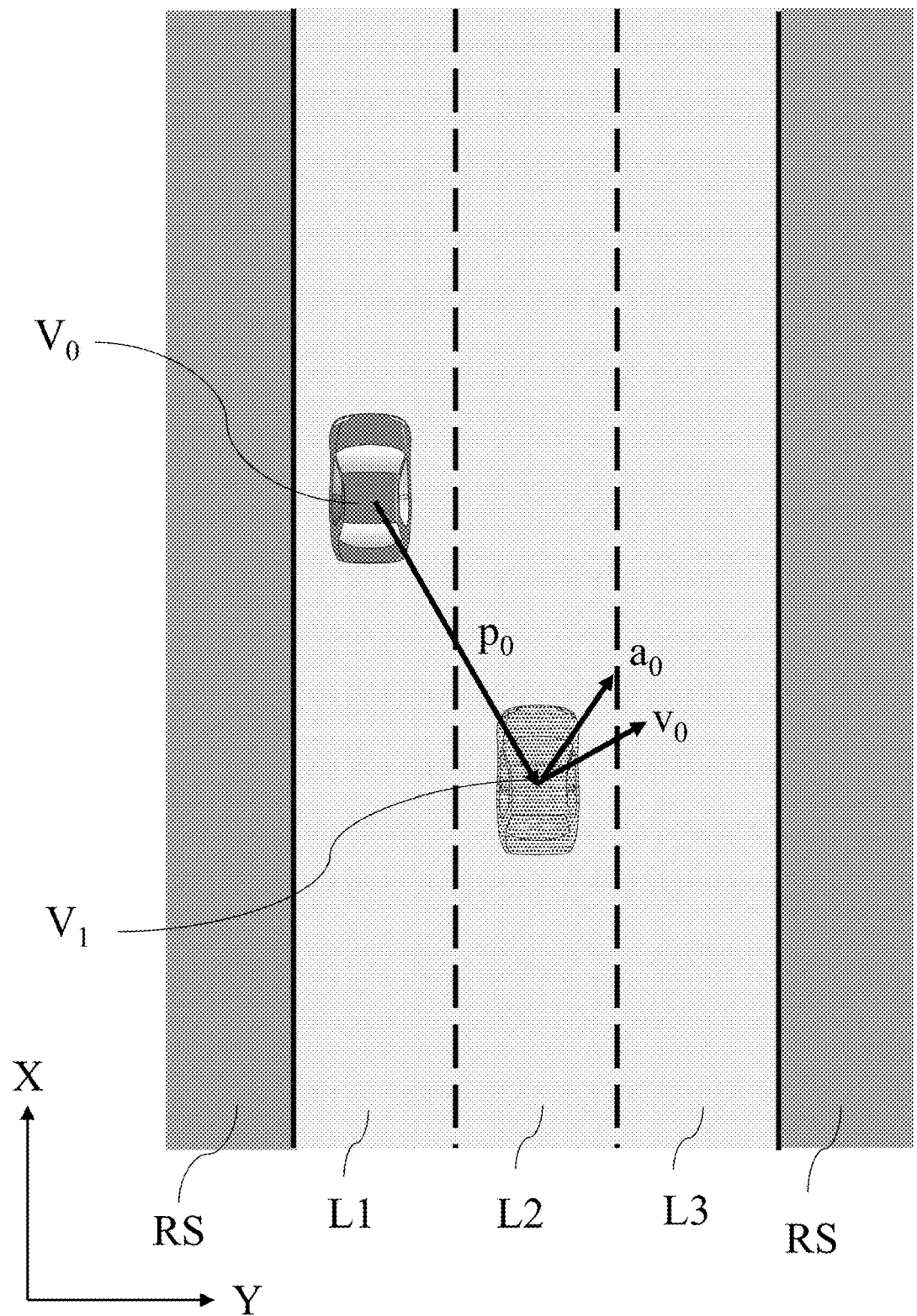
FIG. 8A is a plan view (part 1) for describing a method of estimating the position of another vehicle after a required time, wherein the method is executed by the travel control apparatus for a vehicle according to the present invention.

As illustrated in FIG. 8A, when the traveling direction of the subject vehicle $V_0$ is along X-axis and the road width direction is along Y-axis, the speed vector $v_0$ of the other vehicle $V_1$ is represented by the following equation (1).

$$v_0 = vx_0 i + vy_0 j \quad (1)$$

In the above equation (1), $vx_0$ represents a speed component in the X-axis direction of the speed vector $v_0$ of the other vehicle $V_1$ and $vy_0$ represents a speed component in the Y-axis direction of the speed vector $v_0$ of the other vehicle $V_1$. In the above equation (1), i represents a unit vector in the X-axis direction and j represents a unit vector in the Y-axis direction (the same applies to the following equations (2), (3), and (6)).

The acceleration vector $a_0$ of the other vehicle $V_1$ can be obtained as represented by the following equation (2) while the positional vector $p_0$ of the other vehicle $V_1$ can be obtained as represented by the following equation (3).

$$a_0 = ax_0 i + ay_0 j \quad (2)$$

$$p_0 = px_0 i + py_0 j \quad (3)$$

In the above equation (2), $ax_0$ represents an acceleration component in the X-axis direction of the acceleration vector $a_0$ of the other vehicle $V_1$ and $ay_0$ represents an acceleration component in the Y-axis direction of the acceleration vector $a_0$ of the other vehicle $V_1$. In the above equation (3), $px_0$ represents a positional component in the X-axis direction of the positional vector $p_0$ of the other vehicle $V_1$ and $py_0$ represents a positional component in the Y-axis direction of the positional vector $p_0$ of the other vehicle $V_1$.

Figure 8B:
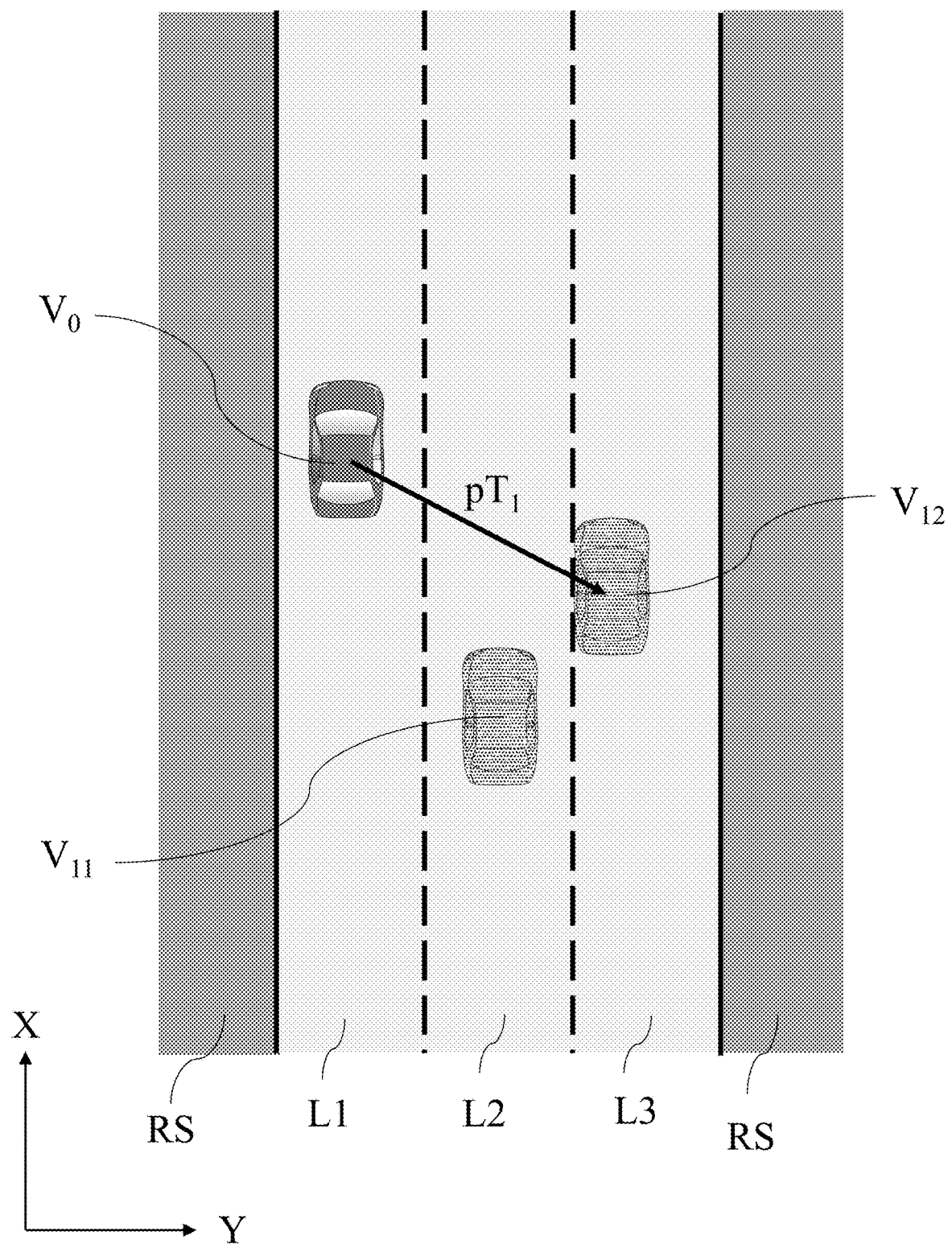
FIG. 8B is a plan view (part 2) for describing a method of estimating the position of another vehicle after a required time, wherein the method is executed by the travel control apparatus for a vehicle according to the present invention.

Then, the control device 19 uses the lane change control function to calculate a positional vector $pT_1$ after the required time T1 of the other vehicle $V_1$, as illustrated in FIG. 8B. Specifically, the control device 19 uses the lane change control function to calculate the positional vector $pT_1$ after the required time T1 of the other vehicle $V_1$ on the basis of the following equations (4) to (6).

$$pxT_1 = px_0 + vx_0 T1 + 1/2(ax_0 T1)^2 \quad (4)$$

$$pyT_1 = py_0 + vy_0 T1 + 1/2(ay_0 T1)^2 \quad (5)$$

$$pT_1 = pxT_1 i + pyT_1 j \quad (6)$$

In the above equations (4) and (5), $pxT_1$ represents a positional component in the X-axis direction of the positional vector $pT_1$ after the required time T1 of the other vehicle $V_1$, $pyT_1$ represents a positional component in the Y-axis direction of the positional vector $pT_1$ after the required time T1 of the other vehicle $V_1$, $vx_0 T1$ represents a moving speed in the X-axis direction of the other vehicle $V_1$ after the required time T1, $vy_0 T1$ represents a moving speed in the Y-axis direction of the other vehicle $V_1$ after the required time T1, $ax_0 T1$ represents acceleration in the X-axis direction of the other vehicle $V_1$ after the required time T1, and $ay_0 T1$ represents acceleration in the Y-axis direction of the other vehicle $V_1$ after the required time T1.

The control device 19 uses the lane change control function to estimate positions after the required time T1 of all other vehicles $V_1$ existing around the subject vehicle $V_0$. Then, the control device 19 uses the lane change control function to estimate an object range OS after the required time T1 on the basis of the positions after the required time T1 of the other vehicles $V_1$. The control device 19 uses the lane change control function to estimate an object range OS after the required time T1 by taking into account the situation of lane regulation after the required time T1, existence of obstacles on the road, presence or absence of obstruction in the adjacent lane L3, and existence of a section, such as a construction section, to which the subject vehicle cannot move. The control device 19 can use the lane change control function to estimate an object range OS after the required time T1 as in step S4.

In step S8, the control device 19 uses the lane change control function to acquire information on a required range RR. The required range RR refers to a range having a size necessary for the subject vehicle $V_0$ to change lanes, or a range having a size that is at least equal to or larger than a size which the subject vehicle $V_0$ occupies on the road surface. In one or more embodiments of the present invention, when a required range RR is set at the target position for changing lanes and the object range OS in the adjacent lane L3 includes the required range RR, a determination is made that a space corresponding to the required range RR exists within the object range OS in the adjacent lane L3, and changing lane to the adjacent lane L3 is permitted. In one or more embodiments of the present invention, the memory of the control device 19 stores information including the shape and size of a required range RR, and the lane change control function is used to acquire the information on the required range RR from the memory of the control device 19.

Figure 9A:
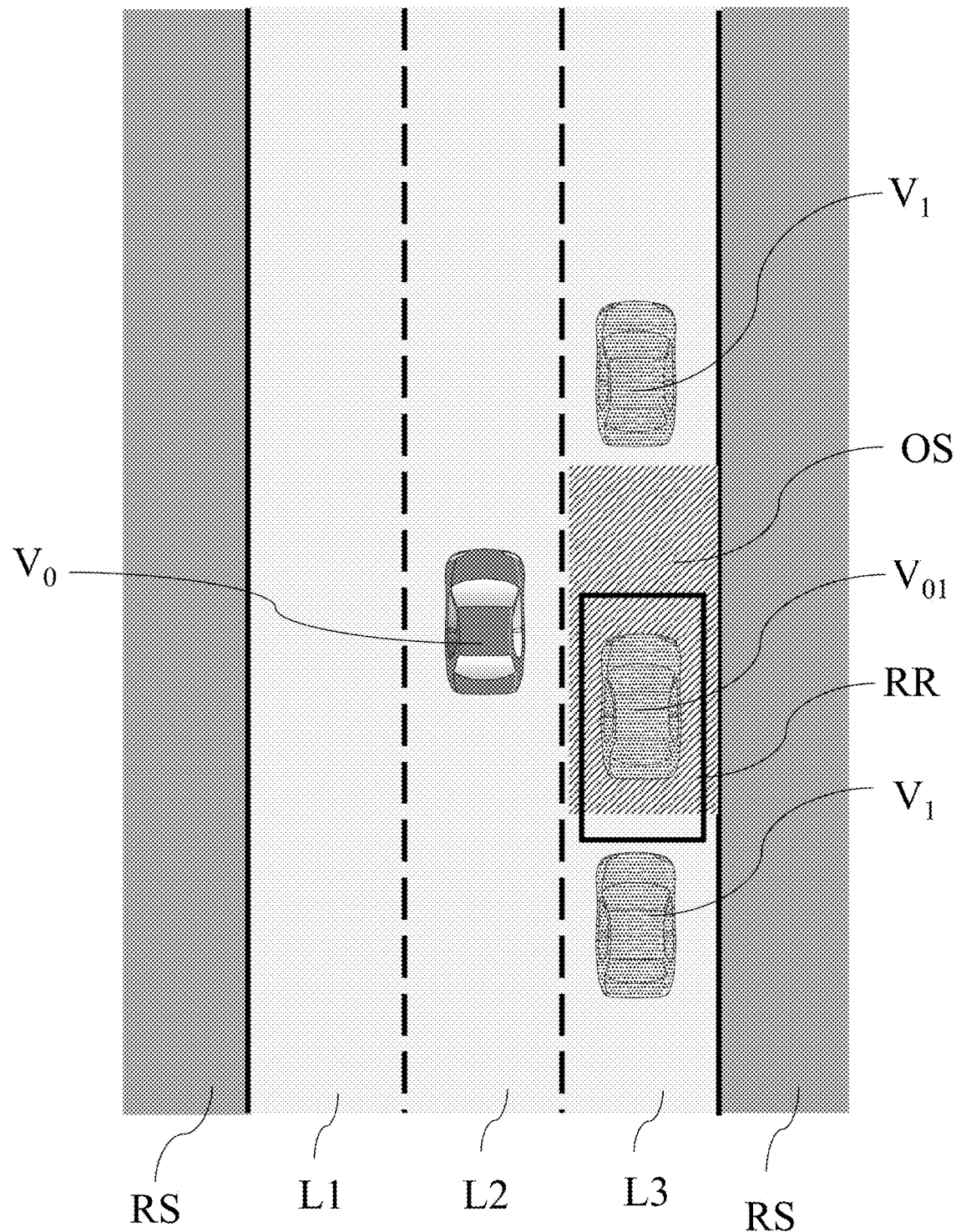
FIG. 9A is a plan view (part 1) for describing a method of determining whether or not changing lanes is possible, wherein the method is executed by the travel control apparatus for a vehicle according to the present invention

In step S9, the control device 19 uses the lane change control function to determine whether or not there is a space within the object range OS in the adjacent lane L3 after the required time T1. The space corresponds to the required range RR acquired in step S8. The object range OS in each of the adjacent lane L2 and the next adjacent lane L3 after the required time T1 is estimated in step S7. Specifically, as illustrated in FIG. 9A, the control device 19 uses the lane change control function to set the required range RR at the target position for changing lane (position of the subject vehicle $V_0$) which is set in step S5. Then, the control device 19 uses the lane change control function to determine whether or not the object range OS in the adjacent lane L3 after the required time T1 includes the required range RR.

Figure 9B:
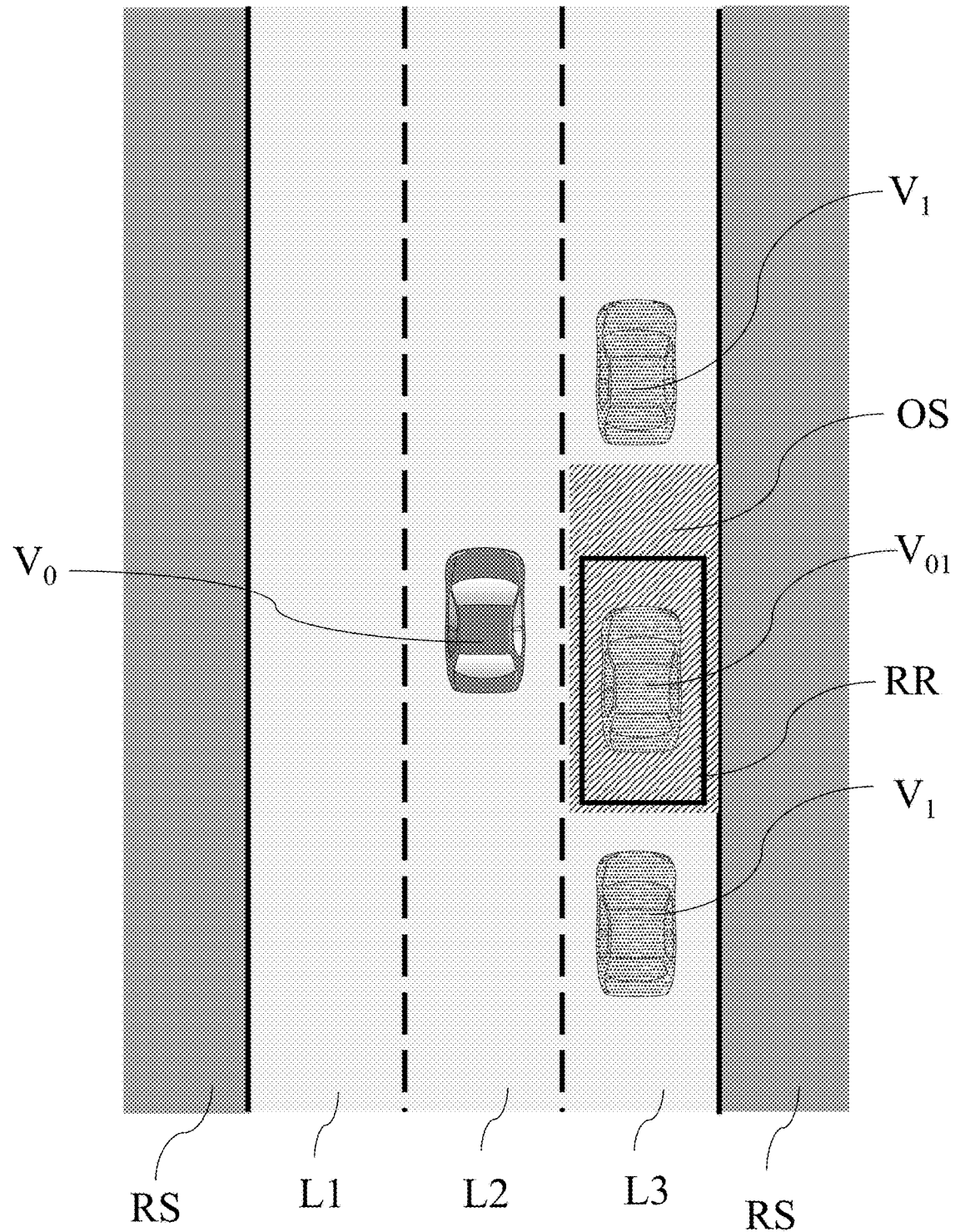
FIG. 9B is a plan view (part 2) for describing a method of determining whether or not changing lanes is possible, wherein the method is executed by the travel control apparatus for a vehicle according to the present invention.

For example, in the example illustrated in FIG. 9A, the object range OS in the adjacent lane L3 after the required time T1 does not include the rear portion of the required range RR. The control device 19 therefore uses the lane change control function to determine that there is not a space corresponding to the required range RR within the object range OS in the adjacent lane L3 after the required time T1. On the other hand, as illustrated in FIG. 9B, when the object range OS in the adjacent lane L3 after the required time T1 includes the required range RR, the control device 19 uses the lane change control function to determine that there is a space corresponding to the required range RR within the object range OS in the adjacent lane L3 after the required time T1. When there is a space corresponding to the required range RR within the object range OS in the adjacent lane L3 after the required time T1, the process proceeds to step S11 illustrated in FIG. 5B, while when there is no space, the process proceeds to step S10.

In step S10, a determination has been made that the object range OS in the adjacent lane L3 after the required time T1 does not include the required range RR and a space cannot be detected which corresponds to the required range RR within the object range OS in the adjacent lane L3 after the required time T1. In step S10, therefore, the control device 19 uses the lane change control function to change the target position for lane change. Specifically, the control device 19 uses the lane change control function to re-set the target position for lane change so that the object range OS in the adjacent lane L3 after the required time T1 includes the required range RR. For example, when the rear portion of the required range RR is not included in the object range OS in the adjacent lane L3 after the required time T1 as illustrated in FIG. 9A, the target position for lane change is shifted frontward. This allows the required range RR to be included in the object range OS in the adjacent lane L3 after the required time T1 as illustrated in FIG. 9B, and a determination is made that a space can be detected which corresponds to the required range RR within the object range OS in the adjacent lane L3 after the required time T1. Step S10 is followed by step S6, from which detection of object ranges OS and the like are performed again.

Figure 5B:
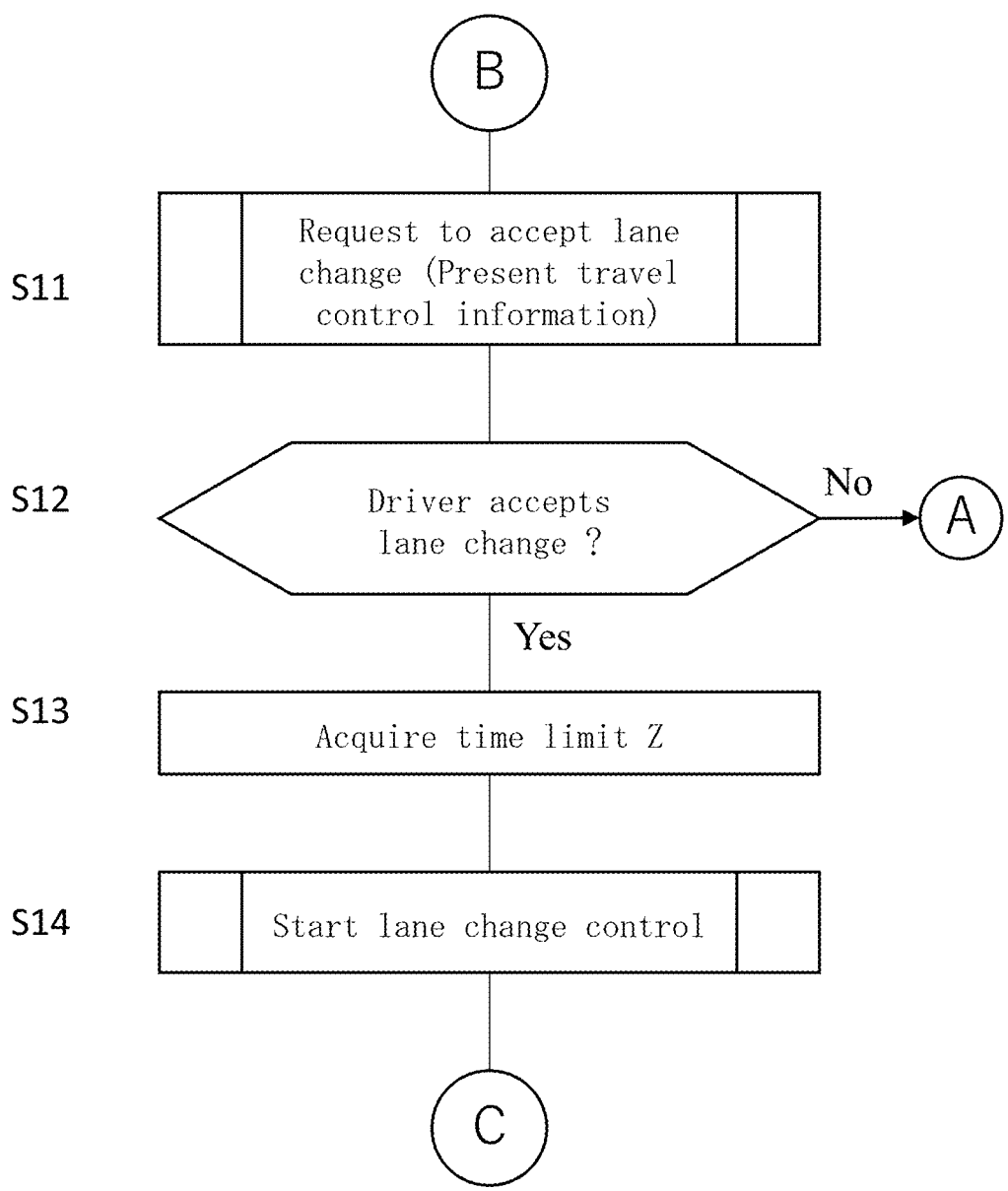
FIG. 5B is a flowchart (part 2) illustrating the lane change control process executed by the travel control apparatus for a vehicle according to the present invention.

On the other hand, when, in step S9 of FIG. 5A, a determination is made that the object range OS in the adjacent lane L3 after the required time T1 includes the required range RR, the process proceeds to step S11 illustrated in FIG. 5B. In step S11 of FIG. 5B, the control device 19 uses the lane change control function to perform an acceptance request process for the first lane change control. In step S11, the control device 19 has determined a situation in which the lane change control from the lane L2 to the lane L3 is possible through the processes of steps S1 to S9; therefore, before actually executing the lane change, the control device 19 requests the driver to make a reply as to whether or not to accept the execution of the lane change control, in order to encourage the driver to confirm safety by himself/herself. This corresponds to the presentation of the first travel control information according to the present invention.

Figure 5C:
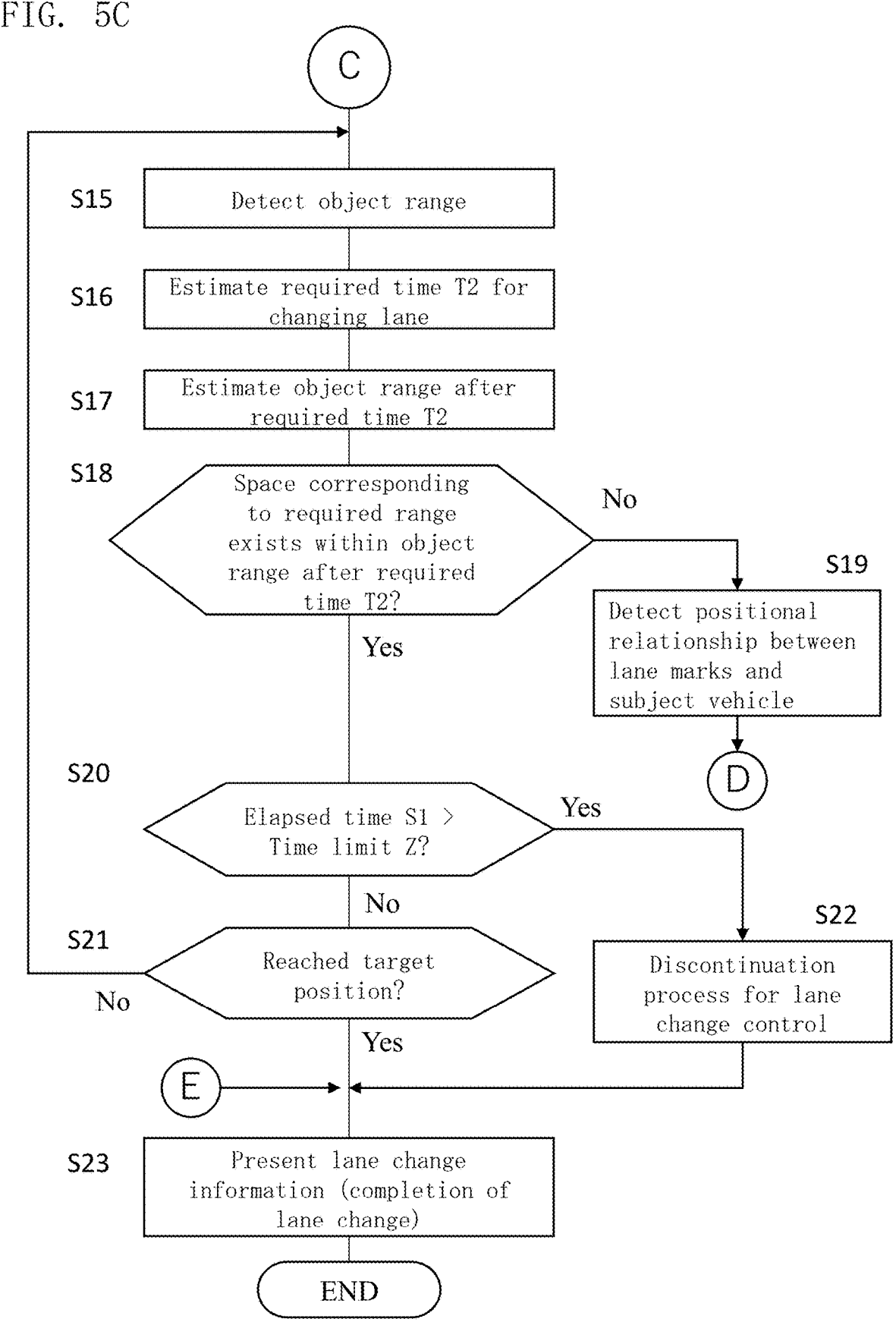
FIG. 5C is a flowchart (part 3) illustrating the lane change control process executed by the travel control apparatus for a vehicle according to the present invention.
Figure 5D:
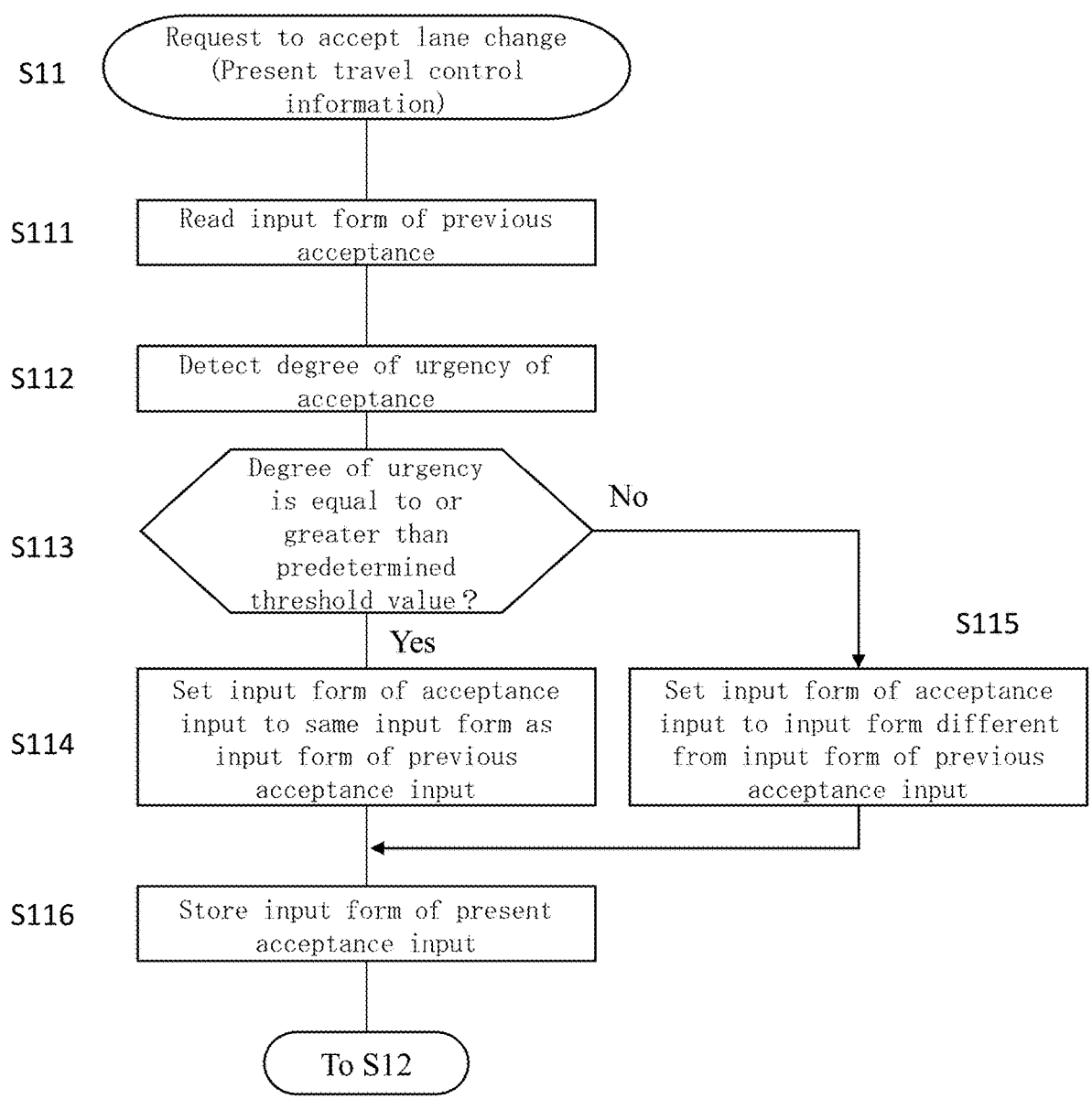
FIG. 5D is a flowchart (part 4) illustrating the lane change control process executed by the travel control apparatus for a vehicle according to the present invention.

FIG. 5D is a flow chart showing the subroutine of the acceptance requesting process of the lane change control executed in S11. In step S111 of FIG. 5D, the control device 19 uses the travel control information presentation function to read the input form of the previous acceptance input. The input form of the previous acceptance input is an input form stored in S116 of steps in the previous routines. It is assumed here that the input form of the previous acceptance input is the second travel control information of the right diagrams of FIGS. 4A to 4E.

In step S112, the control device 19 uses the degree of urgency determination function to determine whether or not the degree of urgency of the acceptance input by the driver is equal to or greater than a predetermined threshold value. As described above, the control device 19 determines that the degree of urgency is greater and, the process proceeds to step S114 when the distance to the interchange turnoff, the entry to a servicing area or the exit from the freeway is short and there is not enough time to shift the vehicle's travel control, or in an environments where the detection accuracy of the surroundings of the vehicle by the sensor 11 is often low, such as in bad weather, and the reliability of the autonomous travel control by the vehicle's travel control apparatus 1 drops below a certain threshold. In step S114, the input form of the present acceptance input is set to the same form as the input form of the previous acceptance input. That is, in this example, the presentation device 15 presents the second travel control information described referring to the respective right diagrams of FIGS. 4A to 4E. In step S116, the control device 19 stores the input form of the present acceptance input.

On the other hand, when, in step S113, a determination is made that the degree of urgency of the acceptance input is lower than the predetermined threshold value, the process proceeds to step S115, and the control device 19 sets the input form of the present acceptance input to an input form different from the input form of the previous acceptance input. That is, in this example, the presentation device 15 presents the first travel control information described referring to the respective left diagrams of FIGS. 4A to 4E.

In the example of FIG. 4A, before starting the lane change from the center lane L2 to the rightmost lane L3 as illustrated in FIG. 3, the control device 19 uses the travel control information presentation function to control the display of the presentation device 15 to display, as illustrated in the left diagram of FIG. 4A, the subject vehicle $V_0$ and the front view image data including the lanes L1, L2, and L3 together with a lane change destination of the subject vehicle $V_0$ and an OK button which is the first input unit 151. The lane change destination of the subject vehicle $V_0$ is displayed by using a visual pattern such as an arrow. In addition, along with this display, voice data is output from the speaker, such as "Do you accept the lane change? If you accept the lane change, please touch the OK button."

In the example of FIG. 4B, before starting the lane change from the center lane L2 to the rightmost lane L3, the control device 19 controls the display of the presentation device 15 to display, as illustrated in the left diagram of FIG. 4B, the subject vehicle $V_0$ and the front view image data including the lanes L1, L2, and L3 together with a lane change destination of the subject vehicle $V_0$, the OK button which is the first input unit 151 and the NG button which is the second input unit 152. The lane change destination of the subject vehicle $V_0$ is displayed by using a visual pattern such as an arrow. In addition, along with this display, voice data is output from the speaker, such as "Do you accept the lane change? If you accept the lane change, please touch the OK button."

In the example of FIG. 4C, before starting the lane change from the center lane L2 to the rightmost lane L3, the control device 19 controls the display of the presentation device 15 to display, as illustrated in the left diagram of FIG. 4C, the subject vehicle $V_0$ and the front view image data including the lanes L1, L2, and L3 together with a lane change destination of the subject vehicle $V_0$, the ○ button and the Δ button. The lane change destination of the subject vehicle $V_0$ is displayed by using a visual pattern such as an arrow. In addition, along with this display, voice data is output from the speaker, such as "Do you accept the lane change? If you accept the lane change, please touch the ○ button."

In the example of FIG. 4D, before starting the lane change from the center lane L2 to the rightmost lane L3, the control device 19 controls the display of the presentation device 15 to display, as illustrated in the left diagram of FIG. 4D, the subject vehicle $V_0$ and the front view image data including the lanes L1, L2, and L3 together with a lane change destination of the subject vehicle $V_0$ and a plurality of ○ buttons (corresponding to the first input unit 151) arranged in a row. The lane change destination of the subject vehicle $V_0$ is displayed by using a visual pattern such as an arrow. In addition, along with this display, voice data is output from the speaker, such as "Do you accept the lane change? If you accept the lane change, please touch the ○ buttons while sliding your finger to the right."

In the example of FIG. 4E, before starting the lane change from the center lane L2 to the rightmost lane L3, the control device 19 controls the display of the presentation device 15 to display, as illustrated in the left diagram of FIG. 4E, the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you accept the lane change? If you accept the lane change, please touch the steering button.

Returning to FIG. 5B, in step S12, the control device 19 determines whether or not the driver accepts the lane change from the lane L2 to the lane L3 in response to the acceptance request of step S11. This will be more specifically described. In response to the first travel control information illustrated in the left diagram of FIG. 4A, the driver visually checks the surrounding situation and the like by himself/herself, and in the case of determining to accept the lane change or in other similar cases, the driver touches the OK button to indicate the driver's intention to accept the lane change from the lane L2 to the lane L3. Likewise, in response to the first travel control information illustrated in the left diagram of FIG. 4B, the driver visually checks the surrounding situation and the like by himself/herself, and in the case of determining to accept the lane change or in other similar cases, the driver touches the OK button to indicate the driver's intention to accept the lane change from the lane L2 to the lane L3. Likewise, in response to the first travel control information illustrated in the left diagram of FIG. 4C, the driver visually checks the surrounding situation and the like by himself/ herself, and in the case of determining to accept the lane change or in other similar cases, the driver touches the ○ button to indicate the driver's intention to accept the lane change from the lane L2 to the lane L3.

Likewise, in response to the first travel control information illustrated in the left diagram of FIG. 4D, the driver visually checks the surrounding situation and the like by himself/herself, and in the case of determining to accept the lane change or in other similar cases, the driver touches the ○ button while sliding the finger to the right to indicate the driver's intention to accept the lane change from the lane L2 to the lane L3. Likewise, in response to the first travel control information illustrated in the left diagram of FIG. 4E, the driver visually checks the surrounding situation and the like by himself/herself, and in the case of determining to accept the lane change or in other similar cases, the driver touches the steering button to indicate the driver's intention to accept the lane change from the lane L2 to the lane L3. When the driver accepts the lane change, from the lane L2 to the lane L3, the process proceeds to step S13, while when the driver does not accept the lane change, the process returns to step S1 without executing the lane change control.

In step S13, the control device 19 uses the lane change control function to acquire a time limit Z for changing lanes. In one or more embodiments of the present invention, as illustrated in FIG. 2, the table stores as the time limit Z the time for the subject vehicle to approach a point at which the lane change is difficult in each travel scene. The control device 19 uses the lane change control function to refer to the table illustrated in FIG. 2 to acquire the time limit Z in the travel scene of the subject vehicle. For example, in the "scene of catching up with a preceding vehicle" among the examples illustrated in FIG. 2, the time limit is stored as (a time to reach the preceding vehicle—α) seconds. In this case, the control device 19 uses the travel control function to refer to the table illustrated in FIG. 2 to calculate the time to reach the preceding vehicle and acquire (the calculated time to reach the preceding vehicle—α) seconds as the time limit Z. The constant α is some seconds (e.g., 5 seconds) and can be set for each travel scene as appropriate. For example, when the time to reach the preceding vehicle is 30 seconds and a is 5 seconds, the time limit Z for changing lanes is 25 seconds.

In step S14, a start process for the lane change control is performed. In the start process for the lane change control, the control device 19 uses the lane change control function to set start timing L at which the autonomous lane change control is started. The method of setting the start timing L is not particularly limited, and the start timing L can be set, for example, with any of the following methods (1) to (8) described below. That is, (1) unique timing is set as the start timing L for the lane change control. For example, the timing after a predetermined time (e.g., 6 seconds) has elapsed from the driver's acceptance of the lane change is set as the start timing L for the lane change control. (2) The start timing L for the lane change control is set based on the necessity level of changing lanes illustrated in FIG. 2. Specifically, the necessity level of changing lanes in the travel scene of the subject vehicle is acquired from the table illustrated in FIG. 2, and when the necessity level of changing lanes is not lower than a predetermined value, the start timing L for the lane change control is set to earlier timing than that in the case in which the necessity level of changing lanes is lower than the predetermined value. (3) The start timing L for the lane change control is set based on the time limit Z for changing lanes illustrated in FIG. 2. Specifically, the time limit Z for changing lanes in the travel scene of the subject vehicle is acquired from the table illustrated in FIG. 2, and when the time limit Z for changing lanes is less than a predetermined time $Z_{th}$, the start timing L for the lane change control is set to earlier timing than that in the case in which the time limit Z for changing lanes is not less than the predetermined time $Z_{th}$. (4) The start timing L for the lane change control is set based on the required time T1 for changing lanes. Specifically, when the required time T1 for changing lanes estimated in step S6 of FIG. 5A is less than a predetermined time $T_{th}$, the start timing L for the lane change control is set to earlier timing than that in the case in which the required time T1 for changing lanes is not less than the predetermined time $T_{th}$.

(5) The start timing L for the lane change control is set based on the time limit Z and required time T1 for changing lanes. Specifically, a margin time Y is obtained from the required time T1 for changing lanes and the time limit Z for changing lanes (e.g., Time limit Z−Required time T1=Margin time Y), and when the margin time Y is less than a predetermined time $Y_{th}$, the start timing L for the lane change control is set to earlier timing than that in the case in which the margin time Y is not less than the predetermined time $Y_{th}$. (6) The start timing L for the lane change control is set based on an attention level (commitment level) ○ that represents a degree as to how the driver is involved in the driving. For example, a determination is made whether the driver is making a conversation or hands-free call, by detecting the driver's voice using the input device 16 such as an onboard microphone or a hands-free device, and when the driver is making a conversation or hands-free call, the driver's attention level ○ is determined to be less than a threshold $O_{th}$, and the start timing L for the lane change control is set to later timing than that in the case in which the driver's attention level ○ is not less than the threshold $O_{th}$.

(7) The start timing L for the lane change control is set based on a traffic congestion level K. For example, the traffic congestion level K is determined based on the distance to a preceding vehicle, the distance to a following vehicle, the number of surrounding vehicles, the congestion level contained in the VICS (registered trademark) information, and/or the degree of deviation between the legal speed and the actual speed of the subject vehicle, and the traffic congestion level K is determined to be higher as the distance to a preceding vehicle is shorter, as the distance to a following vehicle is shorter, as the number of surrounding vehicles is larger, as the congestion level contained in the VICS information is higher, or as the degree of deviation between the legal speed and the actual speed of the subject vehicle is larger. When the traffic congestion level K is not lower than a predetermined value $K_{th}$, the start timing L for the lane change control is set to earlier timing than that in the case in which the traffic congestion level K is lower than the predetermined value $K_{th}$. (8) The start timing L for the lane change control is set based on a likelihood B of changing lanes. For example, a degree at which it can be assured that the subject vehicle changes lanes can be obtained as the likelihood B on the basis of the presence or absence of setting of a destination and/or the distance to a preceding vehicle. Specifically, when the destination is set and it is necessary to change lanes in order for the subject vehicle to reach the destination, a determination is made that the likelihood B of changing lanes is not lower than a threshold $B_{th}$. Additionally or alternatively, when the distance to a preceding vehicle is less than a predetermined distance, a determination is made that the driver desires to change lanes, and the likelihood B of changing lanes is determined to be not less than the threshold $B_{th}$. Then, when the likelihood B of changing lanes is not less than the threshold $B_{th}$, the start timing L for the lane change control is set to earlier timing than that in the case in which the likelihood B of changing lanes is less than the threshold $B_{th}$. Thus, the start timing L for the lane change control is set as above. The above-described (1) to (8) are examples of the method of setting the start timing L, and the method is not limited to the above. In addition, after setting the start timing L, the control device 19 may set, before starting the lane change control, prelimi-nary notice presentation timing P for presenting the lane change information indicating that the lane change will be started.

When the set start timing L is reached, the control device 19 uses the lane change control function to start the lane change control. Specifically, the control device 19 uses the lane change control function to allow the drive control device 18 to start control of the operation of the steering actuator so that the subject vehicle moves to the target position for lane change which are set in step S5 or step S10 of FIG. 5A. After the lane change control is started, the presentation device 15 may present the lane change information indicating that the lane change control is being executed.

In steps S15 to S17 of FIG. 5C, like steps S4 and S6 to S7 of FIG. 5A, the current object range OS and the object range OS after the required time T2 for the subject vehicle $V_O$ to move to the target position related to the first lane change (lane change from the lane L2 to the lane L3 of FIG. 7) are detected. Then, in step S18, the control device 19 uses the lane change control function to determine whether or not there is a space within the object range OS in the adjacent lane L3 after the required time T2. The space corresponds to the required range RR acquired in step S8. The object range OS in each of the adjacent lane L2 and the next adjacent lane L3 after the required time T2 is estimated in step S17. Then, the control device 19 uses the lane change control function to set a required range RR at the target position for the first lane change. When the object range OS in the adjacent lane L3 after the required time T2 includes the required range RR, the control device 19 determines that there is a space corresponding to the required ranges RR within the object range OS in the adjacent lane L3 after the require time T2, and the process proceeds to step S20. On the other hand, when the control device 19 determines that there is not a space corresponding to the required range RR within the object range OS in the adjacent lane L3 after the require time T2, the process proceeds to step S19. The process of step S19 and the subsequent processes will be described later with reference to FIG. 5E.

In step S20, the control device 19 uses the lane change control function to determine whether or not the time limit Z acquired in step S13 has elapsed since the first lane change control was started in step S14. When the elapsed time S1 after starting the first lane change control exceeds the time limit Z, that is, when the target position for the first lane change cannot be reached even after the time limit Z has elapsed since the lane change control was started, the process proceeds to step S22. In step S22, the control device 19 uses the lane change control function to perform a discontinuation process for the first lane change control. Specifically, the control device 19 uses the lane change control function to announce the information indicating that the lane change control will be discontinued to the driver. For example, the control device 19 controls the presentation device 15 to announce a message "Lane changes will be discontinued due to time out" to the driver and then concludes the lane change control. In the discontinuation process for the lane change control, the control device 19 may leave the traveling position of the subject vehicle in the road width direction at the position at which the lane change control is concluded or may also recover the traveling position to the position at which the lane change control is started. When the traveling position is recovered to the position at which the lane change control is started, a message may be announced to the driver, such as "The original position will be recovered due to time out."

On the other hand, when, in step S20, the elapsed time S1 from the start of the lane change control does not exceed the time limit Z, the process proceeds to step S21. In step S21, the control device 19 uses the lane change control function to determine whether or not the subject vehicle has reached the target position for the first lane change. When the subject vehicle has reached the target position for the first lane change, the process proceeds to step S23. In step S23, the first lane change control is completed using the lane change control function, and the presentation device 15 therefore presents the lane change information indicating that the first lane change is completed. When, in step S21, a determination is made that the subject vehicle has not reached the target position for the first lane change, the process returns to step S15.

When, in step S18 of FIG. 5C, a determination is made that there is not a space corresponding to the required range RR within the object range OS in the adjacent lane L3 after the required time T2, the process proceeds to step S19. That is, when there was a space corresponding to the required range RR within the object range OS in the adjacent lane L3 at the time point of step S9 of starting the lane change control but there is not a space corresponding to the required range RR within the object range OS in the adjacent lane L3 after starting the first lane change control, the process proceeds to step S19. In step S19, detection is performed for the positional relationship in the road width direction between the subject vehicle and lane marks which the subject vehicle gets across when changing lane (also referred to as "object lane marks," hereinafter).

Figure 10:
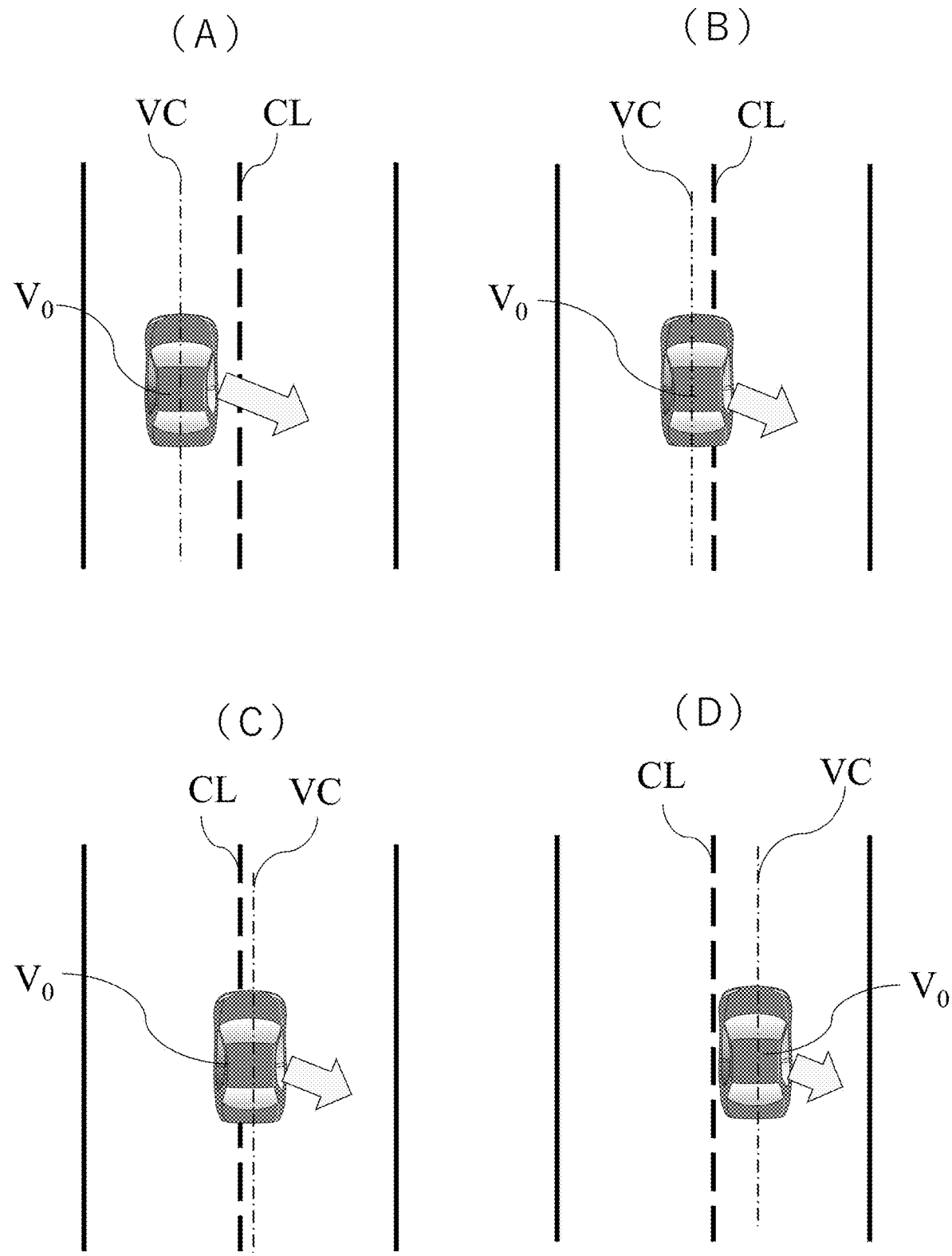
FIG. 10 is a set of diagrams for describing the positional relationship in the road width direction between object lane marks and a subject vehicle.

For example, FIG. 10 exemplifies scenes in which the subject vehicle $V_0$ changes lanes in the direction indicated by arrows in the figure (lane change from the left-side lane to the right-side lane in the figure). In this case, the control device 19 uses the lane change control function to determine any of a state in which no part of the subject vehicle $V_0$ gets across the object lane marks CL as illustrated in FIG. 10(A), a state in which a part of the subject vehicle $V_0$ gets across the object lane marks CL but the center line VC of the subject vehicle $V_0$ does not get across the object lane marks CL as illustrated in FIG. 10(B), a state in which the whole of the subject vehicle $V_0$ does not get across the object lane marks CL but the center line VC of the subject vehicle $V_0$ gets across the object lane marks CL as illustrated in FIG. 10(C), and a state in which the whole of the subject vehicle $V_0$ gets across the object lane marks CL as illustrated in FIG. 10(D).

Figure 5E:
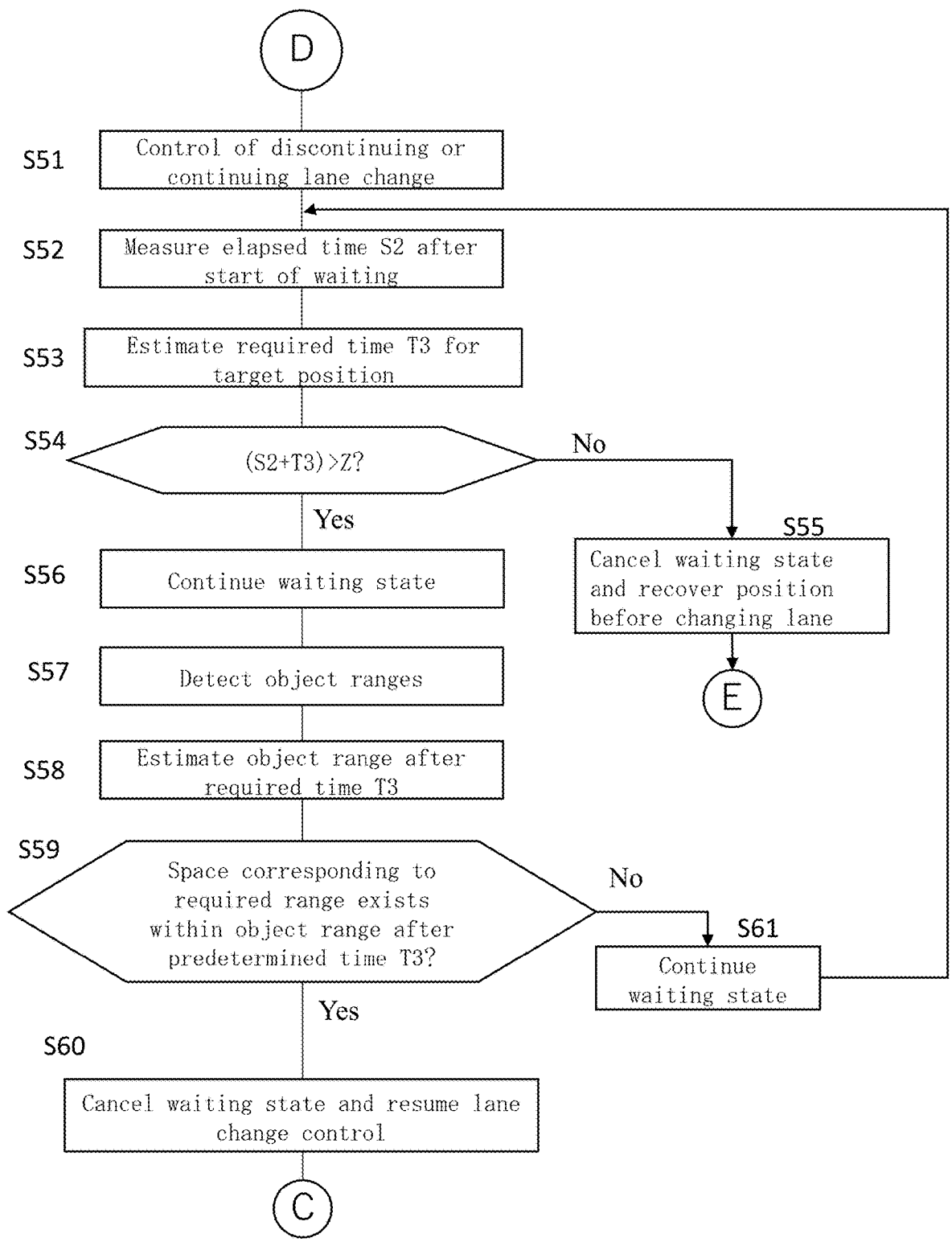
FIG. 5E is a flowchart (part 5) illustrating the lane change control process executed by the travel control apparatus for a vehicle according to the present invention.

In step S51 illustrated in FIG. 5E, the control device 19 uses the lane change control function to perform a control process for discontinuing or continuing the lane change, on the basis of the positional relationship in the road width direction between the object lane marks CL and the subject vehicle $V_0$ determined in step S19 of FIG. 5C. Specifically, the control device 19 uses the autonomous lane change control function to determine (a) a method of presenting information to the driver when discontinuing or continuing the lane change, (b) control after discontinuing or continuing the lane change, and (c) a traveling position of the subject vehicle $V_0$ when discontinuing or continuing the lane change, on the basis of the positional relationship in the road width direction between the object lane marks CL and the subject vehicle $V_0$.

For example, the control device 19 uses the lane change control function to carry out any of the following four methods as the method (a) of presenting information to the driver when discontinuing or continuing the lane change: (a1) a method that includes presenting information for allowing the driver to select between options of discontinuing and continuing the lane change without time limit and, when the driver selects any of the options, executing control of the option (discontinuing or continuing the lane change) selected by the driver; (a2) a method that includes presenting information for allowing the driver to select between options of discontinuing and continuing lane change with time limit and, when the driver selects any of the options within the time limit, executing control of the option (discontinuing or continuing the lane change) selected by the driver or, when the driver does not select between the options within the time limit, executing control (default control) of a predetermined option among the options of discontinuing and continuing the lane change control; (a3) a method that includes autonomously executing discontinuation or continuation of the lane change and expressly providing the driver with a method of canceling the discontinuation or continuation of lane changes which is autonomously executed; and (a4) a method that includes autonomously executing discontinuation or continuation of the lane change without expressly providing the driver with a method of canceling the discontinuation or continuation of lane changes which is autonomously executed.

Additionally or alternatively, the control device 19 uses the lane change control function to carry out any of the following three control schemes as the control content (b) after discontinuing or continuing the lane change: (b1) a scheme that includes discontinuing the lane change and also discontinuing the autonomous travel control; (b2) a scheme that includes discontinuing only the lane change control and continuing the autonomous travel control; and (b3) a scheme that includes suspending the lane change control into a waiting state until a space corresponding to the required range RR is detected again within the object range OS in the adjacent lane L3 and resuming the lane change control when a space corresponding to the required range RR is detected again within the object range OS in the adjacent lane L3.

Additionally or alternatively, the control device 19 uses the lane change control function to carry out any of the following three positional adjustment schemes for the traveling position (c) of the subject vehicle when discontinuing or continuing the lane change control: (c1) a scheme that includes recovering the position of the subject vehicle to the original position before starting the lane change; (c2) a scheme that includes moving the subject vehicle to a position in the vicinity of the object lane marks CL in the lane in which the subject vehicle traveled before starting the lane change; and (c3) a scheme that includes maintaining the current position.

The control device 19 uses the lane change control function to perform the control process for discontinuing or continuing the lane change by appropriately combining two or more of the method (a) of presenting information to the driver when discontinuing or continuing the lane change, the control content (b) after discontinuing or continuing the lane change, and the traveling position (c) of the subject vehicle when discontinuing or continuing the lane change, on the basis of the positional relationship in the road width direction between the object lane marks CL and the subject vehicle $V_0$.

For example, when no part of the subject vehicle $V_0$ gets across the object lane marks CL as illustrated in FIG. 10(A), the control device 19 can carry out the method (a4) that includes autonomously executing discontinuation of the lane change without expressly providing the driver with a method of canceling the discontinuation of the lane change. In this case, the control device 19 can use the lane change control function to carry out the scheme (b1) that includes discontinuing the lane change and also discontinuing the autonomous travel control and the scheme (c 1) that includes recovering the position of the subject vehicle to the original position before starting the lane change. In such a case, the control device 19 can announce the control content to be performed from that time for discontinuing the lane change to the driver, such as "Position will be recovered to the original position because the space for changing lanes may be insufficient" and "Autonomous travel control will be canceled after recovery to the original position." In this case, the process proceeds to step S23 of FIG. 5C to conclude the lane change control.

When a part of the subject vehicle $V_0$ gets across the object lane marks CL but the center line VC of the subject vehicle $V_0$ does not get across the object lane marks CL as illustrated in FIG. 10(B), the control device 19 can carry out the method (a3) that includes autonomously executing discontinuation of the lane change and expressly providing the driver with a method of canceling the discontinuation of the lane change. In this case, the control device 19 can use the lane change control function to carry out the scheme (c2) that includes moving the subject vehicle $V_0$ to a position in the vicinity of the object lane marks CL in the lane in which the subject vehicle traveled before starting the lane change and then carry out the scheme (b2) that includes discontinuing only the lane change control and continuing the autonomous travel control. In such a case, the control device 19 can announce the control content to be performed from that time for discontinuing the lane changes to the driver, such as "Position will be recovered into the original lane because the space for changing lanes may be insufficient" and "Previous autonomous travel control will be continued after recovery to the original position." Additionally or alternatively, the control device 19 can display a message "Please press the button below if lane changes should be continued" together with a button for continuing the lane changes. When the driver presses the button for continuing lane changes, the process proceeds to step S52 of FIG. 5E, while when the driver does not press the button for continuing lane changes, the process proceeds to step S23 of FIG. 5C.

When the whole of the subject vehicle $V_0$ does not get across the object lane marks CL but the center line VC of the subject vehicle $V_0$ gets across the object lane marks CL as illustrated in FIG. 10(C), the control device 19 can carry out the method (a4) that includes autonomously executing continuation of the lane change without expressly providing the driver with a method of canceling the continuation of the lane change. In this case, the control device 19 can carry out the scheme (c3) that includes waiting while maintaining the traveling position of the subject vehicle at the current position and the scheme (b3) that includes suspending the lane change until a space corresponding to the required range RR is detected again within the object range OS in the adjacent lane L3 and resuming the lane change control when a space corresponding to the required range RR is detected again within the object range OS in the adjacent lane L3. In this case, for example, the control device 19 can announce the control content to be performed from that time for continuing the lane change to the driver, such as "Waiting will be conducted at the current position because the space for changing lanes may be insufficient" and "Lane change control will be resumed if a space for changing lanes is found." In this case, the process proceeds to step S52 of FIG. 5E.

When the whole of the subject vehicle $V_0$ gets across the object lane marks CL as illustrated in FIG. 10(D), the control device 19 can carry out the method (a4) that includes autonomously executing discontinuation of the lane change without expressly providing the driver with a method of canceling the discontinuation of the lane change control. In this case, the control device 19 can carry out the scheme (c3) that includes maintaining the traveling position of the subject vehicle at the current position and the scheme (b2) that includes discontinuing only the lane change control and continuing the autonomous travel control. In this case, the control device 19 can announce the control content to be performed from that time for discontinuing the lane change to the driver, such as "Waiting will be conducted at the current position because the space for changing lanes may be insufficient" and "Previous autonomous travel control will be continued." In this case, the process proceeds to step S23 of FIG. 5C to conclude the travel control process.

The positional relationship in the road width direction between the object lane marks CL and the subject vehicle $V_0$ is not limited to the four scenes illustrated in FIGS. 10(A) to (D) and five or more or three or less possible scenes may be employed. The combination of control schemes for each positional relationship is not limited to the above-described combinations. Any combination is possible among two or more of the method (a) of presenting information to the driver when discontinuing or continuing the lane change control, the control content (b) after discontinuing or continuing the lane change control, and the traveling position (c) of the subject vehicle when discontinuing or continuing the lane change.

Description will then be made for a case in which continuation of the lane change is executed in step S51 of FIG. 5E. Step S51 of starting the continuation of the lane change is followed by step S52. In step S52, the control device 19 uses the lane change control function to measure an elapsed time S2 after the lane change control comes to a waiting state in step S51. That is, in one or more embodiments of the present invention, when the lane changes are continued in step S51, the lane changes are suspended and the lane change control comes to a waiting state until a space corresponding to the required range RR is detected again in the object range OS in the adjacent lane L3. In step S52, the elapsed time S2 after starting the waiting of the lane change control in this manner is measured.

In step S53, the control device 19 uses the lane change control function to estimate a required time T3 for the subject vehicle to move from the current position to the target position for changing lane. The required time T3 can be estimated in the same method as in step S6 of FIG. 5A.

In step S54, the control device 19 uses the lane change control function to determine whether or not the total time (S2+T3) of the elapsed time S2 measured in step S52 and the required time T3 estimated in step S53 exceeds the time limit Z acquired in step S13 of FIG. 5B. When the total time (S2+T3) exceeds the time limit Z, the process proceeds to step S55, in which the control device 19 uses the lane change control function to cancel the waiting state of the lane change control and move the subject vehicle to the traveling position of the subject vehicle before start of changing lanes. Step S55 is followed by step S23 of FIG. 5C, in which the lane change control is concluded. On the other hand, when the total time (S2+T3) does not exceed the time limit Z, the process proceeds to step S56.

In step S56, the control device 19 continues the waiting state of the lane change control. Step S56 is followed by steps S57 to S58, in which the current object range and the object range after the required time T3 are detected as in steps S4 and S7 of FIG. 5A. Then, in step S59, as in step S9 of FIG. 5A, the control device 19 determines whether or not there is a space corresponding to the required range RR within the object range OS in the adjacent lane L3 after the required time T3. The object range OS in the adjacent lane L3 after the required time T3 is estimated in step S58. In step S59, the control device 19 sets the required range RR at the target position for changing lane. When the object range OS in the adjacent lane L3 after the required time T3 includes the required range RR, the control device 19 determines that there is a space corresponding to the required range RR within the object range OS in the adjacent lane L3 after the required time T3, and the process proceeds to step S60. In step S60, the control device 19 uses the lane change control function to cancel the waiting state of the lane change control and resume the lane change control because a space corresponding to the required range RR is detected within the object range OS in the adjacent lane L3. The process in this case returns to step S15 of FIG. 5C. On the other hand, when a determination is made in step S59 that there is not a space corresponding to the required range RR within the object range in the adjacent lane L3 after the required time T3, the process proceeds to step S61.

Next, after the lane change from the lane L2 to the lane L3 illustrated on the left diagram of FIG. 3 is executed, the lane change control from the lane L3 to the lane L2 illustrated on the right diagram of FIG. 3 will be described referring to FIGS. 5A to 5E. When the lane change illustrated in the left diagram of FIG. 3 is executed, the control device 19 executes the process of the step S23 of FIG. 5C, and then the process returns to the step S1 of FIG. 5A. Then, the respective processes of steps S1 to S10 are executed for the lane change control illustrated in the right diagram of FIG. 3. Note that these processes are the same as the lane change control process illustrated in the left diagram of FIG. 3 described above, and therefore their descriptions are omitted.

In step S11 of FIG. 5B, the control device 19 uses the lane change control function to perform an acceptance request process for the present (second) lane change control. In step S11, the control device 19 has determined a situation in which the lane change from the lane L3 to the lane L2 is possible through the processes of steps S1 to S9. Therefore, before actually executing the lane change, the control device 19 requests the driver to make a reply as to whether or not to accept the execution of the lane change control, in order to encourage the driver to confirm safety by himself/herself. This corresponds to the presentation of the second travel control information according to the present invention.

In step S111 of FIG. 5D illustrating the subroutine of the acceptance requesting process of the lane change control executed in step S11, the control device 19 uses the travel control information presentation function to read the input form of the previous acceptance input. The input form of the previous acceptance input is an input form stored in S116 of steps in the previous routines. Suppose that input form of the previous acceptance input, that is the first acceptance input, of the lane change from the lane L2 to the lane L3 is the first travel control information of the left diagrams of FIGS. 4A to 4E.

In step S112, the control device 19 uses the degree of urgency determination function to determine whether or not the degree of urgency of the acceptance input by the driver is equal to or greater than a predetermined threshold value. When a determination is made that the degree of urgency of the acceptance input is greater, the process proceeds to step S114. In step S114, the control device 19 sets the input form of the present acceptance input to the same form as the input form of the previous acceptance input. That is, in this example, the presentation device 15 presents the first travel control information described referring to the respective left diagrams of FIGS. 4A to 4E. In step S116, the control device 19 stores the input form of the present acceptance input.

On the other hand, when a determination is made in step S113 that the degree of urgency of the acceptance input is lower than the predetermined threshold value, the process proceeds to step S115. In step 115, the control device 19 sets the input form of the present acceptance input to an input form different from the input form of the previous acceptance input. That is, in this example, the presentation device 15 presents the first travel control information described referring to the respective right diagrams of FIGS. 4A to 4E.

In the example of FIG. 4A, before starting the lane change from the rightmost lane L3 to the center lane L2 as illustrated in FIG. 3, the control device 19 uses the travel control information presentation function to control the display of the presentation device 15 to display, as illustrated in the right diagram of FIG. 4A, the subject vehicle $V_0$ and the front view image data including the lanes L1, L2, and L3 together with a lane change destination of the subject vehicle $V_0$ and an OK button which is the second input unit 152. The lane change destination of the subject vehicle $V_0$ is displayed by using a visual pattern such as an arrow. In addition, along with this display, voice data is output from the speaker, such as "Do you accept the lane change? If you accept the lane change, please touch the OK button."

In the example of FIG. 4B, before starting the lane change from the rightmost lane L3 to the center lane L2, the control device 19 controls the display of the presentation device 15 to display, as illustrated in the right diagram of FIG. 4B, the subject vehicle $V_0$ and the front view image data including the lanes L1, L2, and L3 together with a lane change destination of the subject vehicle $V_0$, the OK button which is the second input unit 152 and the NG button which is the first input unit 151. The lane change destination of the subject vehicle $V_0$ is displayed by using a visual pattern such as an arrow. In addition, along with this display, voice data is output from the speaker, such as "Do you accept the lane change? If you accept the lane change, please touch the OK button."

In the example of FIG. 4C, before starting the lane change from the rightmost lane L3 to the center lane L2, the control device 19 controls the display of the presentation device 15 to display, as illustrated in the right diagram of FIG. 4C, the subject vehicle $V_0$ and the front view image data including the lanes L1, L2, and L3 together with a lane change destination of the subject vehicle $V_0$, the ○ button and the Δ button. The lane change destination of the subject vehicle $V_0$ is displayed by using a visual pattern such as an arrow. In addition, along with this display, voice data is output from the speaker, such as "Do you accept the lane change? If you accept the lane change, please touch the Δ button."

In the example of FIG. 4D, before starting the lane change from the rightmost lane L3 to the center lane L2, the control device 19 controls the display of the presentation device 15 to display, as illustrated in the right diagram of FIG. 4D, the subject vehicle $V_0$ and the front view image data including the lanes L1, L2, and L3 together with a lane change destination of the subject vehicle $V_0$ and a plurality of ○ buttons (corresponding to the first input unit 151) arranged in a row. The lane change destination of the subject vehicle $V_0$ is displayed by using a visual pattern such as an arrow. In addition, along with this display, voice data is output from the speaker, such as "Do you accept the lane change? If you accept the lane change, please touch the ○ buttons while sliding your finger to the left."

In the example of FIG. 4E, before starting the lane change from the rightmost lane L3 to the center lane L2, the control device 19 controls the display of the presentation device 15 to display, as illustrated in the right diagram of FIG. 4E, the subject vehicle $V_0$ and the front view image data including the lanes L1, L2, and L3 together with a lane change destination of the subject vehicle $V_0$, which is displayed using a visual pattern such as an arrow. In addition, along with this display, voice data is output from the speaker, such as "Do you accept the lane change? If you accept the lane change, please operate a blinker lever.

Returning to FIG. 5B, in step S12, the control device 19 determines whether or not the driver accepts the lane change from the lane L3 to the lane L2 in response to the acceptance request of step S11. This will be more specifically described. In response to the second travel control information illustrated in the right diagram of FIG. 4A, the driver visually checks the surrounding situation and the like by himself/herself, and in the case of determining to accept the lane change or in other similar cases, the driver touches the OK button which is set to the second input unit 152 to indicate the driver's intention to accept the lane change from the lane L3 to the lane L2. Likewise, in response to the second travel control information illustrated in the right diagram of FIG. 4B, the driver visually checks the surrounding situation and the like by himself/herself, and in the case of determining to accept the lane change or in other similar cases, the driver touches the OK button which is set to the second input unit 152 to indicate the driver's intention to accept the lane change from the lane L3 to the lane L2. Likewise, in response to the second travel control information illustrated in the right diagram of FIG. 4C, the driver visually checks the surrounding situation and the like by himself/herself, and in the case of determining to accept the lane change or in other similar cases, the driver touches the Δ button to indicate the driver's intention to accept the lane change from the lane L3 to the lane L2.

Likewise, in response to the second travel control information illustrated in the right diagram of FIG. 4D, the driver visually checks the surrounding situation and the like by himself/herself, and in the case of determining to accept the lane change or in other similar cases, the driver touch the ○ button while sliding the finger to the left, so as to indicate the driver's intention to accept the lane change from the lane L3 to the lane L2. Likewise, in response to the second lane change information illustrated in the right diagram of FIG. 4E, the driver visually checks the surrounding situation and the like by himself/herself, and in the case of determining to accept the lane change or in other similar cases, the driver operates the blinker lever to indicate the driver's intention to accept the lane change from the lane L3 to the lane L2. When the driver accepts the lane change from the lane L3 to the lane L2, the process proceeds to step S13, while when the driver does not accept the lane change, the process returns to step S1 without executing the lane change control.

The process from step S13 of FIG. 5B to step S23 of FIG. 5C is the same as the process of the lane change control illustrated in the left diagram of FIG. 3 described above, and therefore the explanation thereof is omitted, but the execution of these processes completes the lane change from the lane L3 to the lane L2 illustrated in the right diagram of FIG. 3.

As described above, the travel control apparatus 1 and travel control method for a vehicle in one or more embodiments of the present invention, before executing the autonomous travel control for the vehicle, sets an input form of a present acceptance input in response to a travel control information presented to a driver to an input form different from an input form of a previous acceptance input. That is, each time the autonomous travel control is executed, the input form of the acceptance input by the driver is changed, so the driver will be aware of or pay attention to the changed input form. This allows the driver to keep monitoring the operation of the vehicle.

According to the travel control apparatus 1 and travel control method for a vehicle in one or more embodiments of the present invention, an input destination for a previous acceptance input is set to a first input device in a vehicle, and an input destination for a present acceptance input is set to a second input device different from the first input device. Therefore, since the driver must check the input device changed each time the autonomous travel control, such as the lane change, is executed, thereby preventing distraction of attention. As a result, the driver itself becomes more aware of confirming safety, and thus the ability to monitor the operation of the subject vehicle is evoked.

According to the travel control apparatus 1 and travel control method for a vehicle in one or more embodiments of the present invention, an input destination for a previous acceptance input is set to a first input unit 151 of an input device, and an input destination for an present acceptance input is set to a second input unit 152 different from the first input unit 151. Therefore, since the driver must check the positions of the input unit 151 and 152 changed each time the autonomous travel control such as lane change is executed, thereby preventing the distraction. As a result, the driver itself becomes more aware of confirming safety, and thus the ability to monitor the operation of the subject vehicle is evoked.

According to the travel control apparatus 1 and travel control method for a vehicle in one or more embodiments of the present invention, a previous travel control information presents information which includes a first input unit 151 and does not include a second input unit 152, and a present travel control information presents information which includes the second input unit 152 and does not include the first input unit 151. Therefore, since the driver must check the positions of the input unit 151 and 152 changed each time the autonomous travel control such as lane change is executed, thereby preventing the distraction. As a result, the driver itself becomes more aware of confirming safety, and thus the ability to monitor the operation of the subject vehicle is evoked.

According to the travel control apparatus 1 and travel control method for a vehicle in one or more embodiments of the present invention, the input device further has a third input unit to which a first non-acceptance input is input and a fourth input unit to which a second non-acceptance input is input, the third unit is set to a position different from a first input position, the fourth input unit is set to a position different from a second input position, wherein a previous travel control information presents the third input unit and the first input unit, and the present travel control information presents the fourth input unit and the second input unit. Therefore, since the driver must check the positions of the input unit 151 and 152 changed each time the autonomous travel control such as lane change is executed, thereby preventing the distraction. As a result, the driver itself becomes more aware of confirming safety, and thus the ability to monitor the operation of the subject vehicle is evoked. In addition, the presentation of the intention of the non-acceptance can be performed by the driver's specific action, thereby the non-acceptance can be more reliably conveyed.

According to the travel control apparatus 1 and travel control method for a vehicle in one or more embodiments of the present invention, an input destination for a previous acceptance input is set to a first input unit for receiving an input by a first input method, and an input destination for a present acceptance input is set to a second input unit for receiving an input by a second input method different from the first input method. Therefore, since the driver must check the input method of the acceptance input changed each time the autonomous travel control such as lane change is executed, thereby preventing the distraction. As a result, the driver itself becomes more aware of confirming safety, and thus the ability to monitor the operation of the subject vehicle is evoked.

According to the travel control apparatus 1 and travel control method for a vehicle in one or more embodiments of the present invention, when degree of urgency of a present acceptance input by the driver is equal to or greater than a predetermined threshold value, an input form of a present acceptance input is set to the same form as an input form of a previous acceptance input. This allows the driver to focus on monitoring the vehicle without allowing extra attention to the input form of the present acceptance input.

According to the travel control apparatus 1 and travel control method for a vehicle in one or more embodiments of the present invention, an autonomous travel control includes at least one of a lane change control of the vehicle, a right turn travel control or a left turn travel control of the vehicle, and a departure travel control of the vehicle from a main road or an entry travel control to the main road. Since the major controls of the autonomous travel control is included, the ability to monitor the operation of the subject vehicle is more evoked.

According to the travel control apparatus 1 and travel control method for a vehicle in one or more embodiments of the present invention, the execution of an autonomous travel control is prohibited when an acceptance input by the driver is not detected. This makes it possible to execute the travel control prioritizing the driver safety check.

EXPLANATIONS OF LETTERS OR NUMERALS

1 . . . Travel control apparatus
11 . . . Sensors
12 . . . Subject vehicle position detection device
13 . . . Map database
14 . . . Onboard equipment
15 . . . Presentation device
151 . . . First input unit
152 . . . Second input unit
16 . . . Input device
17 . . . Communication device
18 . . . Drive control device
19 . . . Control device
$V_0$ . . . Subject vehicle
$V_1$ . . . Another vehicle
L1, L2, L3 . . . Lane
RS . . . Road shoulders
OS . . . Object ranges
RR . . . Required range
RA . . . Range in which subject vehicle cannot travel
RL . . . Mark indicating prohibition of lane change
CL . . . Object lane marks
VC . . . Center line of subject vehicle

The invention claimed is:

1. A travel control method for a vehicle for executing autonomous travel control of the vehicle, comprising:
before executing the autonomous travel control as a first travel control, presenting, while the vehicle is traveling, a driver with first travel control information as to whether or not to accept execution of the first travel control;
setting an input form of an acceptance input for the first travel control;
after detecting, in response to a presentation of the first travel control information, the acceptance input for the first travel control indicating that the driver accepts the execution of the first travel control, autonomously executing the first travel control;
after executing the first travel control, setting, based on the input form of the acceptance input for the first travel control, an input form of an acceptance input for a second travel control, different from the first travel control, to an input form different from the input form of an acceptance input for the first travel control; and
after detecting the acceptance input for the second travel control, executing the second travel control.

2. The travel control method for the vehicle according to claim 1, comprising:
after detecting the acceptance input for the first travel control and executing the first travel control,
presenting the driver with second travel control information as to whether or not the driver accepts the execution of the second travel control, and when detecting, in response to the presentation of the second travel control information, the acceptance input by the driver for the second travel control, whose input form is different from the input form of the acceptance input for the first travel control, executing the second travel control.

3. The travel control method for the vehicle according to claim 1, wherein
the vehicle comprises a first input device and a second input device different from the first input device, comprising:
setting an input destination for the acceptance input for the second travel control to the second input device when the acceptance input for the first travel control is input to the first input device.

4. The travel control method for the vehicle according to claim 1, wherein
the vehicle comprises an input device having a first input unit set to a first position and a second input unit set to a second position different from the first position, comprising:
setting an input destination for the acceptance input for the first travel control to the first input unit, and setting an input destination for the acceptance input for the second travel control to the second input unit.

5. The travel control method for the vehicle according to claim 4, wherein
the first travel control information as to whether or not the driver accepts the execution of the first travel control presents information which includes the first input unit and does not include the second input unit and
second travel control information as to whether or not the driver accepts the execution of the second travel control presents information which includes the second input unit and does not include the first input unit.

6. The travel control method for the vehicle according to claim 5, wherein the input device further has a third input unit to which non-acceptance input is input and a fourth input unit to which the non-acceptance input is input, the non-acceptance input indicating that the driver does not accept the execution of the autonomous travel control, the fourth input unit being set to a position different from a position of the third input unit, comprising:

setting the third input unit to a third position different from the first position, and setting the fourth input unit to a fourth position different from the second position, wherein the first travel control information presents the third input unit and the first input unit, and the second travel control information presents the fourth input unit and the second input unit.

7. The travel control method for the vehicle according to claim 1, wherein the vehicle comprises an input device having a first input unit for receiving an input by a first input method and a second input unit for receiving an input by a second input method different from the first input method, comprising:

setting an input destination for the acceptance input for the first travel control to the first input unit, and setting an input destination for the acceptance input for the second travel control to the second input unit.

8. The travel control method for the vehicle according to claim 1, wherein the autonomous travel control includes at least one of a lane change control of the vehicle, a right turn travel control or a left turn travel control of the vehicle, and a departure travel control of the vehicle from a main road or an entry travel control to the main road.

9. The travel control method for the vehicle according to claim 1 comprising:

prohibiting the execution of the autonomous travel control when the acceptance input by the driver is not detected.

10. A travel control method for a vehicle for executing autonomous travel control of the vehicle, comprising:

before executing a first travel control, presenting, while the vehicle is traveling, a driver with first travel control information as to whether or not to accept execution of the first travel control;

setting an input form of an acceptance input for the first travel control;

after detecting the acceptance input for the first travel control, executing the first travel control;

determining whether or not a degree of urgency of an acceptance input for a second travel control by the driver is greater than a predetermined threshold value;

when the degree of the urgency of the acceptance input for the second travel control is greater than the predetermined threshold value, setting an input form of the acceptance input to a same form as the input form of the acceptance input for the first travel control;

when the degree of urgency of the acceptance input for the second travel control is less than the predetermined threshold value, setting the input form of the acceptance input for the second travel control to an input form different from the input form of the acceptance input for the first travel control; and after detecting the acceptance input for the second travel control, executing the second travel control.

11. A travel control apparatus for a vehicle for executing autonomous travel control of the vehicle, comprising a controller configured to:

before executing the autonomous travel control as a first travel control, present, while the vehicle is traveling, a driver with first travel control information as to whether or not to accept execution of the first travel control;

set an input form of an acceptance input for the first travel control;

after detecting, in response to a presentation of the first travel control information, the acceptance input for the first travel control indicating that the driver accepts the execution of the first travel control, autonomously execute the first travel control;

after executing the first travel control, set, based on the input form of the acceptance input for the first travel control, an input form of an acceptance input for a second travel control to an input form different from the input form of an acceptance input for the first travel control; and after detecting the acceptance input for the second travel control, execute the second travel control.

* * * * *